US012607319B2

(12) United States Patent
Giraud et al.

(10) Patent No.: US 12,607,319 B2
(45) Date of Patent: Apr. 21, 2026

(54) LIGHT MODULE FOR A MOTOR VEHICLE

(71) Applicant: VALEO VISION, Bobigny (FR)

(72) Inventors: Sylvain Giraud, Bobigny (FR); Nicolas Martin, Bobigny (FR)

(73) Assignee: Valeo Vision, Bobigny (FR)

( * ) Notice: Subject to any disclaimer, the term of this patent is extended or adjusted under 35 U.S.C. 154(b) by 108 days.

(21) Appl. No.: 18/293,490

(22) PCT Filed: Jul. 29, 2022

(86) PCT No.: PCT/EP2022/071473
§ 371 (c)(1),
(2) Date: Jan. 30, 2024

(87) PCT Pub. No.: WO2023/007016
PCT Pub. Date: Feb. 2, 2023

(65) Prior Publication Data
US 2024/0280236 A1 Aug. 22, 2024

(30) Foreign Application Priority Data
Jul. 30, 2021 (FR) ....................................... 2108381

(51) Int. Cl.
*F21S 41/675* (2018.01)
*B60Q 1/068* (2006.01)
(Continued)

(52) U.S. Cl.
CPC ............ *F21S 41/675* (2018.01); *B60Q 1/068* (2013.01); *B60Q 1/076* (2013.01); *F21S 41/148* (2018.01);
(Continued)

(58) Field of Classification Search
CPC .......... F21S 41/675; F21S 41/67; F21S 41/36; F21S 41/151; F21S 41/657; F21S 41/65; B60Q 1/068; B60Q 1/076; B60Q 1/0683
See application file for complete search history.

(56) References Cited

U.S. PATENT DOCUMENTS 6,220,735 B1 * 4/2001 Matubara ............. B60Q 1/0683
362/531
6,799,876 B2 10/2004 Ravier
(Continued)

FOREIGN PATENT DOCUMENTS

DE 69715530 T2 6/2003
EP 1270322 A1 1/2003
(Continued)

OTHER PUBLICATIONS

European Patent Office, International Search Report (with English translation) and Written Opinion of corresponding International Application No. PCT/EP2022/071473, dated Sep. 29, 2022.

*Primary Examiner* — Jong-Suk (James) Lee
*Assistant Examiner* — James M Endo
(74) *Attorney, Agent, or Firm* — Valeo Vision

(57) ABSTRACT

The invention relates to a luminous module for a vehicle including at least one light source configured to emit light rays, at least one collector associated with the at least one light source, and configured to collect and direct the light rays from the at least one light source toward at least one exit optical element, with the at least one exit optical element configured to transmit the light rays toward the outside of the vehicle to form a light beam The luminous module further including a system for lateral relative movement of the at
(Continued)

least one collector and the at least one associated light source relative to the at least one exit optical element in such a way as to cause the light beam to move laterally.

16 Claims, 18 Drawing Sheets

(51) Int. Cl.

| | |
|---|---|
| *B60Q 1/076* | (2006.01) |
| *F21S 41/148* | (2018.01) |
| *F21S 41/151* | (2018.01) |
| *F21S 41/26* | (2018.01) |
| *F21S 41/32* | (2018.01) |
| *F21S 41/657* | (2018.01) |
| *F21W 102/155* | (2018.01) |

(52) U.S. Cl.
CPC ............. *F21S 41/151* (2018.01); *F21S 41/26* (2018.01); *F21S 41/321* (2018.01); *F21S 41/657* (2018.01); *F21W 2102/155* (2018.01)

(56) References Cited

U.S. PATENT DOCUMENTS

| | | | | |
|---|---|---|---|---|
| 2005/0122735 A1* | 6/2005 | Watanabe | ................ | B60Q 1/06 |
| | | | | 362/539 |
| 2008/0144329 A1* | 6/2008 | Okuda | .................. | F21S 41/155 |
| | | | | 362/547 |
| 2008/0198617 A1* | 8/2008 | Schwab | ................. | B60Q 1/076 |
| | | | | 362/545 |
| 2008/0266890 A1* | 10/2008 | Mochizuki | ............ | B60Q 1/076 |
| | | | | 362/524 |
| 2015/0204503 A1* | 7/2015 | Krenn | ..................... | F21S 41/39 |
| | | | | 362/514 |
| 2017/0314755 A1* | 11/2017 | Cholley | .................. | F21S 45/40 |

FOREIGN PATENT DOCUMENTS

| | | | |
|---|---|---|---|
| FR | 2813829 | A1 | 3/2002 |
| JP | H06176604 | A | 6/1994 |
| WO | 2020025171 | A1 | 2/2020 |

* cited by examiner

LIGHT MODULE FOR A MOTOR VEHICLE

TECHNICAL FIELD

The present invention relates to a luminous module for a vehicle. It is particularly, but non-limitingly, applicable to motor vehicles.

BACKGROUND OF THE INVENTION

In the field of motor vehicles, a luminous module for a vehicle that is well known to a person skilled in the art comprises:

at least one light source configured to emit light rays, at least one collector associated with said at least one light source, said collector being configured to collect and direct the light rays from said at least one light source, at least one exit optical element configured to transmit the light rays toward the outside of said motor vehicle to form a light beam.

The luminous module is integrated in a luminous device and further comprises one or more masks which are styling components and which close off the luminous module. The luminous device is a motor vehicle headlamp. The light beam may be adjusted such that it has vertical and lateral travel. Vertical travel is useful for adapting to the attitude of the vehicle, which varies from one category of vehicle to another and which varies according to the load of the vehicle, and for lowering the light beam to avoid dazzling an occupant of an approaching vehicle. Lateral travel is useful for relative adjustment between two luminous modules and for ensuring good alignment of the light beam in relation to the vehicle axis. For this purpose, all of the components (said at least one light source, said at least one collector, said at least one exit optical element) of the luminous module are set in motion.

One disadvantage of this prior state cited is that it is necessary to have a structural component to move the entire luminous module. The structural component/luminous module assembly is therefore very bulky.

SUMMARY OF THE INVENTION

In this context, the present invention aims to propose a luminous module for a vehicle that proposes a solution to the abovementioned disadvantage.

To this end, the invention proposes a luminous module for a vehicle, said luminous module comprising:

at least one light source configured to emit light rays, at least one collector associated with said at least one light source, said collector being configured to collect and direct the light rays from said at least one light source toward at least one exit optical element, said at least one exit optical element configured to transmit said light rays toward the outside of said vehicle to form a light beam, characterized in that said luminous module further comprises a system for lateral relative movement of said at least one collector and said at least one associated light source relative to said at least one exit optical element in such a way as to cause said light beam to move laterally.

"Lateral relative movement" means that the movement includes at least one lateral translation. Thus, the at least one collector and said at least one associated light source shift laterally relative to the at least one exit optical element, that is to say that any point of the at least one collector or of said at least one associated light source shifts laterally relative to the at least one exit optical element.

Thus, as will be seen below, moving said at least one collector and said at least one associated light source relative to said at least one exit optical element makes it possible to have lateral and/or vertical travel, without having to move all of the components of the optical module. This eliminates the structural component that was used specifically for this purpose. This also avoids having clearances with respect to the styling components and therefore prevents light leaking through these clearances. The front of the luminous module remains fixed, the front being formed by said at least one exit optical element and the styling components, while the rear of the optical module is set in motion for lateral and/or vertical movement, the rear being formed by said at least one collector and said at least one light source.

According to non-limiting embodiments, said luminous module may furthermore comprise one or more of the following additional features, implemented alone or in any technically possible combination.

According to a non-limiting embodiment, said luminous module comprises a plurality of light sources and a plurality of collectors each associated with a light source.

According to a non-limiting embodiment, said luminous module comprises a plurality of exit optical elements, of which one part of the exit optical elements is associated with a first portion of said light beam and the other part of the exit optical elements is associated with a second portion of said light beam.

According to a non-limiting embodiment, the exit optical element comprises a projection lens, in particular a plurality of projection lenses.

According to a non-limiting embodiment, the exit optical element consists of a projection lens, or the exit optical element consists of a plurality of projection lenses.

According to a non-limiting embodiment, the exit optical element comprises a reflector, in particular a plurality of reflectors. A reflector is also called a mirror.

According to a non-limiting embodiment, the exit optical element consists of a reflector, or the exit optical element consists of a plurality of reflectors.

According to a non-limiting embodiment, the first portion represents an inclined cut-off of said light beam, and the second portion represents a flat cut-off of said light beam.

According to a non-limiting embodiment, said system for lateral relative movement comprises:

a pivot connection of center A and axis AE and a ball joint of center D which are arranged laterally on either side of said at least one exit optical element, a pivot connection of center B and a pivot connection or ball joint of center C which are arranged laterally on either side of the plurality of collectors, the pivot connection or connections having an axis parallel to the axis AE, two parallel connecting rods with the same length, each respectively connecting the pivot connection of center A and the pivot connection of center B, and the ball joint of center D and the pivot connection or ball joint of center C in such a way as to form a parallelogram ABCD, a primary actuator configured to rotate the pivot connection of center A in a substantially transverse direction in such a way as to transversely move said plurality of collectors, a primary annular linear connection of center F connecting said primary actuator to one of said connecting rods to form a primary crank.

According to a non-limiting embodiment, said pivot connection of center A and axis AE is produced by means of a ball joint of center A and a secondary annular linear connection of center E.

According to a non-limiting embodiment, said at least one collector, said at least one exit optical element and said connecting rods are configured to take up a position in which said parallelogram ABCD forms a rectangle.

According to a non-limiting embodiment, the lateral relative movement of said at least one collector and said at least one associated light source generates an angle of lateral travel of between plus or minus 5° and in particular between plus or minus 3° for the light beam.

According to a non-limiting embodiment, said at least one exit optical element has an angle of inclination relative to a perpendicular to an optical axis of the luminous module of 15° maximum.

According to a non-limiting embodiment, said luminous module further comprises a system for vertical relative movement of said at least one collector and said at least one associated light source relative to said at least one exit optical element in such a way as to cause said light beam to move vertically.

According to a non-limiting embodiment, said annular linear connection of center E connects a secondary actuator to one of said connecting rods to form a secondary crank, said secondary actuator being configured to rotate the plurality of collectors about the axis AD.

According to a non-limiting embodiment, said primary annular linear connection has an axis parallel to the axis AE.

According to a non-limiting embodiment, the vertical relative movement of said at least one collector and said at least one associated light source generates an angle of vertical travel of between plus or minus 10° and in particular between plus or minus 7° for the light beam.

According to a non-limiting embodiment, said at least one exit optical element has a minimum radius of curvature of 200 mm.

According to a non-limiting embodiment, said light beam is a high beam.

According to a non-limiting embodiment, said light beam is a low beam.

Also proposed is a luminous device comprising a luminous module according to any one of the preceding claims.

BRIEF DESCRIPTION OF DRAWINGS

According to a non-limiting embodiment, the luminous device is a headlamp.

The invention and the various applications thereof will be better understood on reading the following description and studying the accompanying figures, in which:

FIG. 37 is a kinematic view of the mechanical elements of the system for vertical relative movement of FIG. 29, when said plurality of collectors together with said plurality of light sources are in a vertical position located above the nominal vertical position of FIG. 33, and of the mechanical elements of the system for lateral relative movement of FIG. 29, when said plurality of collectors together with said plurality of light sources are in a lateral position located to the left of the nominal lateral position of FIG. 33, according to a non-limiting embodiment, FIG. 38 is a kinematic view of the mechanical elements of the system for vertical relative movement of FIG. 29, when said plurality of collectors together with said plurality of light sources are in a vertical position located above the nominal vertical position of FIG. 33, and of the mechanical elements of the system for lateral relative movement of FIG. 29, when said plurality of collectors together with said plurality of light sources are in the nominal lateral position of FIG. 33, according to a non-limiting embodiment.

DETAILED DESCRIPTION OF THE INVENTION

Elements that are identical in terms of structure or function and that appear in various figures retain the same references, unless indicated otherwise.

The luminous module 1 for a vehicle 2 according to the invention will now be described with reference to FIGS. 1 to 41. In one non-limiting embodiment, the vehicle 2 is a motor vehicle. A motor vehicle is understood to mean any type of motorized vehicle. This embodiment is taken as a non-limiting example in the remainder of the description. In the remainder of the description, the vehicle 2 is thus otherwise referred to as the motor vehicle 2.

Figure 1:
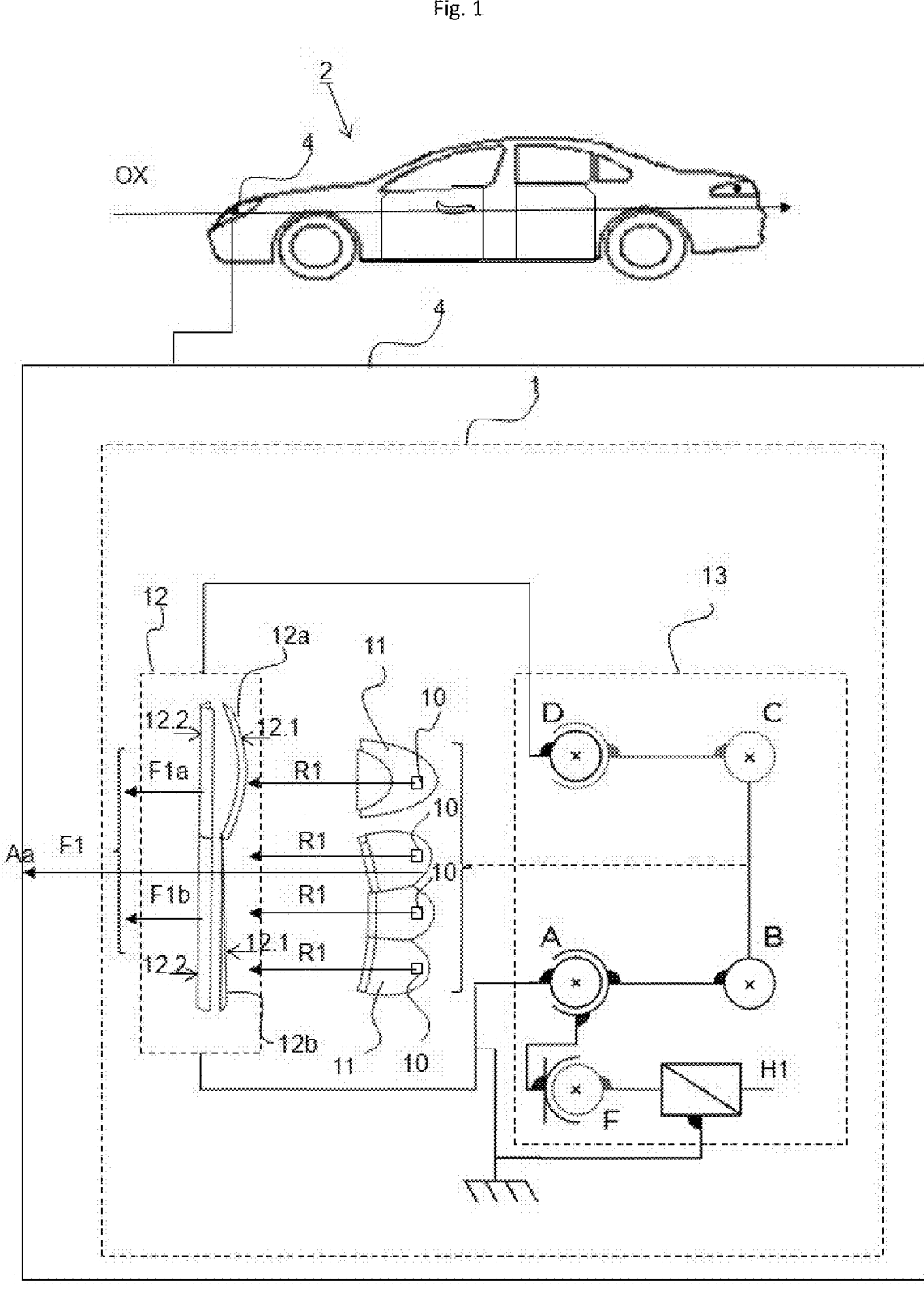
FIG. 1 is a schematic top view of a luminous module comprising a plurality of light sources, a plurality of collectors, a plurality of exit optical elements, and a system for lateral relative movement of said plurality of collectors together with said plurality of light sources relative to said plurality of exit optical elements, according to a non-limiting embodiment of the invention.

As shown in FIG. 1, the luminous module 1 is configured to be integrated in a housing of a luminous device 4. In one non-limiting embodiment, the luminous device 4 is a head-lamp. The luminous device 4 thus comprises a housing (not shown) in which at least one luminous module 1 is integrated. In one non-limiting embodiment, the luminous device 4 comprises an exit outer lens (not shown) which closes off the housing. In another non-limiting embodiment, it is said at least one exit optical element 12 described below which closes off said housing.

The luminous module 1 comprises:
at least one light source 10,
at least one collector 11 associated with said at least one light source 10,
at least one exit optical element 12,
a system for lateral relative movement 13 of said at least one collector 1 and said associated light source 10 relative to said at least one exit optical element 12 in such a way as to cause said light beam F1 to move laterally. The system for lateral relative movement 13 is otherwise referred to as the system for lateral movement 13.

As shown in FIG. 1, in one non-limiting embodiment, the luminous module 1 comprises:
a plurality of light sources 10,
a plurality of collectors 11 each associated with a light source 10,
a plurality of exit optical elements 12,
a system for lateral relative movement 13 of said plurality of collectors 11 and their associated light sources 10 relative to said exit optical elements 12 in such a way as to cause said light beam F1 to move laterally.
In the non-limiting example illustrated, the luminous module 1 comprises:
four light sources 10,
four collectors 11 each associated with a light source 10,
two exit optical elements 12.
In the non-limiting example illustrated, one of the exit optical elements 12 is placed facing one of the four collectors 11, and the other of the exit optical elements 12 is placed facing the other three collectors 11.

This non-limiting embodiment will be considered, by way of non-limiting example, in the remainder of the description. Note that in FIG. 1, the light sources 10 are shown by transparency.

Figure 3:
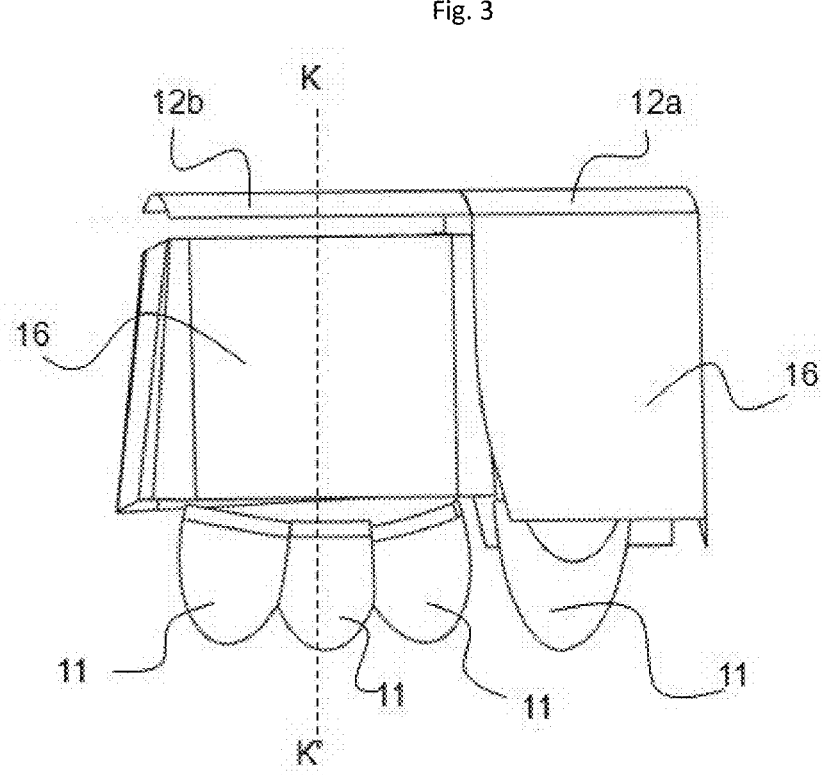
FIG. 3 is a top view of said luminous module of FIG. 1, with the addition of at least one shield, said luminous module 1 being shown without the system for lateral relative movement and without the system for vertical relative movement, according to a non-limiting embodiment.
Figure 4:
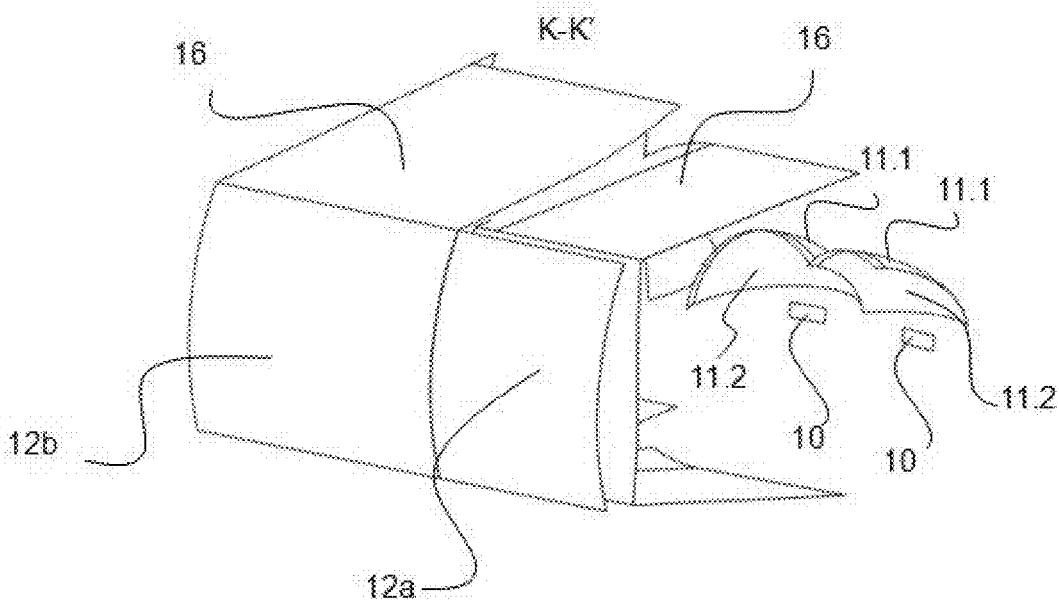
FIG. 4 is a perspective sectional view of said luminous module of FIG. 3, according to a non-limiting embodiment, FIG. 5 schematically depicts the light rays generated by said plurality of light sources of said luminous module of FIG. 1 which are collected by said plurality of collectors of said luminous module and reflected in the direction of said plurality of exit optical elements of said luminous module, according to a non-limiting embodiment.

In a non-limiting embodiment illustrated in the top view of FIG. 3 and in the sectional view of FIG. 4, the luminous module 1 further comprises at least one shield 16, otherwise referred to as the mask 16 or styling component 16, for closing off the luminous module 1. Said at least one shield 16 extends from the collectors 11 toward said exit optical elements 12.

Figure 2:
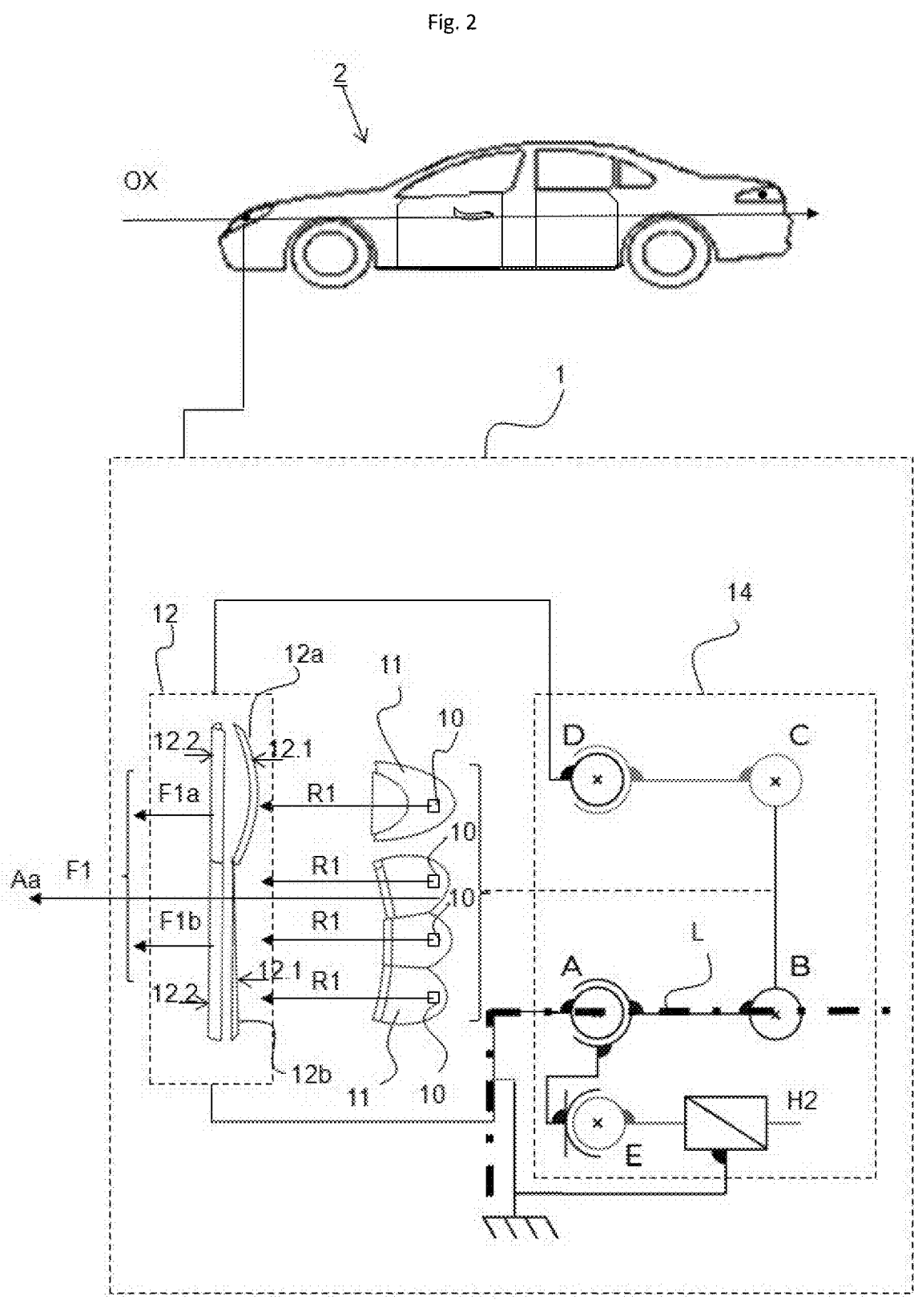
FIG. 2 is a schematic deployed view of the luminous module of FIG. 1, said luminous module further comprising a system for vertical relative movement of said plurality of collectors together with said plurality of light sources relative to said plurality of exit optical elements, according to a non-limiting embodiment.

In a non-limiting embodiment illustrated in FIG. 2, the luminous module 1 further comprises a system for vertical relative movement 14 of said plurality of collectors 11 and their associated light sources 10 relative to said exit optical elements 12 in such a way as to cause said light beam F1 to move vertically. In FIG. 2, the system for lateral relative movement 13 has been shown only partially. Note that in FIG. 2, above the line L in alternating dots and dashes, the elements are shown in top view, while below the line L, the elements are shown in side view. The system for lateral relative movement 13 is otherwise referred to as the system for lateral movement 13.

The elements of the luminous module 1 are described in detail below.

In one non-limiting embodiment, the light sources 10 are semi-conductor light sources. In one non-limiting embodiment, the semi-conductor light sources form part of a light-emitting diode or a laser diode. The term "light-emitting diode" means any type of light-emitting diodes, whether, in non-limiting examples, this involves LEDs (Light-Emitting Diodes), OLEDs (Organic LEDs), AMO-LEDs (Active-Matrix-Organic LEDs), or FOLEDs (Flexible OLEDs).

The light sources 10 are configured to emit light rays R1 (shown in FIGS. 1 and 2). These light rays R1 will arrive on the plurality of collectors 11. The collectors 11 comprise a support 11.1 (shown in FIGS. 4 and 5) in the form of a shell or cap, and a reflective surface 11.2 (shown in FIGS. 4 and 5) on the inner face of the support 11.1. In non-limiting embodiments, the reflective surface 11.2 has a profile of elliptical or parabolic type.

Figure 5:
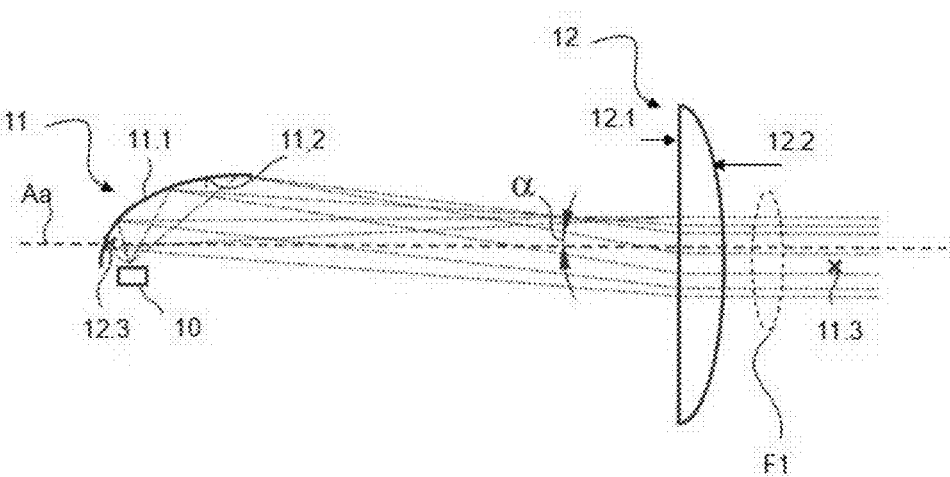

As shown in FIG. 5, the reflective surface 11.2, if it is of elliptical type, has a second focus 11.3 located in front of the exit optical element 12 and at a distance from the optical axis Aa of the luminous module 1. Note that it is also possible for this focus 11.3 to be located behind the exit optical element 12 and/or on the optical axis Aa, provided that it is in proximity to said exit optical element 12, in such a way as to decrease the width of the light beam F1 at the entrance face 12.1 of said exit optical element 12. This makes it possible to reduce the height of the exit optical element 12 and therefore to reduce the bulk of the luminous module 1.

Each collector 11 of said plurality of collectors 11 is associated with a light source 10. Each collector 11 is configured to collect and direct the light rays R1 from the associated light source 10 toward an exit optical element 12, the light rays R1 reflecting on said reflective surface 11.2 of the collector 11. In one non-limiting embodiment, the plurality of collectors 11 forms a reflector referred to as multi-cavity.

The light source 10 associated with a collector 11 is located at a focus of the reflective surface 11.2 of said collector 11 such that its light rays R1 are collected and reflected along the optical axis Aa (shown in FIG. 5) of the luminous module 1. In one non-limiting embodiment, at least some of these reflected rays have angles of inclination α in a vertical plane with respect to said optical axis Aa which are less than or equal to 25°, so as to be under what are referred to as Gaussian conditions, allowing stigmatism, that is to say sharpness of the projected image, to be obtained. In one non-limiting variant embodiment, the angles of inclination α are less than or equal to 10°.

In one non-limiting embodiment, the light sources 10 are arranged on a PCB ("Printed Circuit Board") support (not shown) which is itself attached to a radiator (not shown) for cooling the light sources 10. The radiator is attached to the collectors 11.

As will be seen below, the collectors 11/light sources 10/radiator assembly may be set in motion such that the light beam F1 can move vertically and/or laterally, while the exit optical element 12 remains immobile, as do(es) the mask(s) 16 of said luminous module 1. Thus, the rear of the luminous module 1 formed by the collectors 11/light sources 10/radiator assembly moves, while the front formed by the exit optical element 12 and the mask(s) 16 remains fixed.

The exit optical element 12 is configured to transmit the light rays R1 toward the outside of the motor vehicle 2 to form a light beam F1 along the optical axis Aa of said luminous module 1. It comprises an entrance face 12.1 (shown in FIGS. 1 and 5) which receives the light rays R1 and an exit face 12.2 (shown in FIGS. 1 and 5) via which the light beam F1 formed by the light rays R1 exits. Said at least one exit optical element 12 has a focus 12.3 (shown in FIG. 5) which is located along the optical axis Aa, at the light source 10 or behind said light source 10. In this case, the focus 12.3 is located on the reflective surface 11.2 of the collector 11. Note that it is also possible for this focus 12.3 to be located behind or in front of the reflective surface 11.2.

In one non-limiting embodiment, the light beam F1 is a segmented light beam. It is thus possible to turn off certain segments so as not to dazzle a vehicle approaching said motor vehicle 2, for example. In this case, the reflective surface 11.2 of the collectors 11 has several vertical sectors.

In a first non-limiting embodiment, the light beam F1 is a high beam, i.e. it has a flat cut-off.

In a second non-limiting embodiment, the light beam F1 is a low beam, i.e. it has an inclined cut-off and a flat cut-off. The flat cut-off and the inclined cut-off delimit the upper part of the respective portion of the light beam F1. It thus has two parts, including a first portion F1a which represents an inclined cut-off referred to as "kink" having in particular an inclined part; and a second portion F1b which represents a flat cut-off referred to as "flat". The two parts F1a, F1b are described below. In one non-limiting embodiment, the inclined cut-off comprises an inclined part and a flat part forming an angle between them.

In one non-limiting embodiment shown in FIG. 1 or 5, said at least one exit optical element 12 is a projection lens. It is a converging projection lens which projects the image of the reflective surface 11.2 to infinity. In non-limiting embodiments, the projection lens is plano-convex or convex-convex or a meniscus. The projection lens is thin. In one non-limiting embodiment, its thickness is less than 7 mm (millimeters). In one embodiment, said at least one exit optical element 12 is planar or has a slight curvature. In one non-limiting example, the curvature has a minimum radius of curvature of 200 mm (millimeters). Below, in the case of a light beam F1 comprising two parts F1a and F1b described later on, the vertical travel will not be the same. Said at least one exit optical element 12 is thus relatively straight with respect to the vehicle axis OX. When seen from above, it is relatively straight. This allows for a sufficient angle of vertical travel (7° in one non-limiting example). Moreover, the lateral movement will not deform the flat cut-off F1b of the light beam F1 described below.

Figure 6:
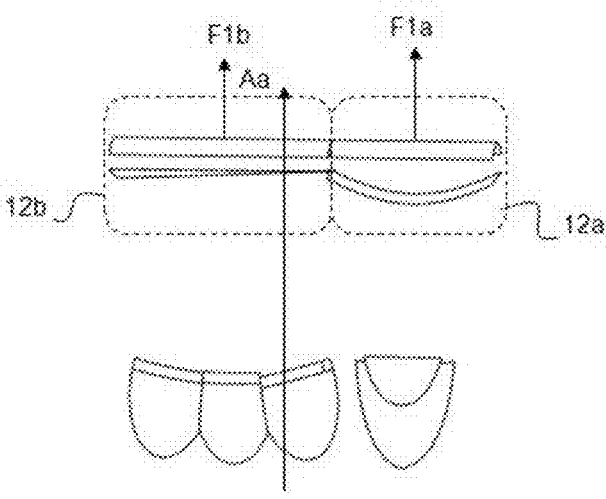
FIG. 6 is the top view of said luminous module of FIG. 3 without said at least one shield, said plurality of exit optical elements being positioned relative to said plurality of collectors in a first position, according to a non-limiting embodiment.
Figure 7:
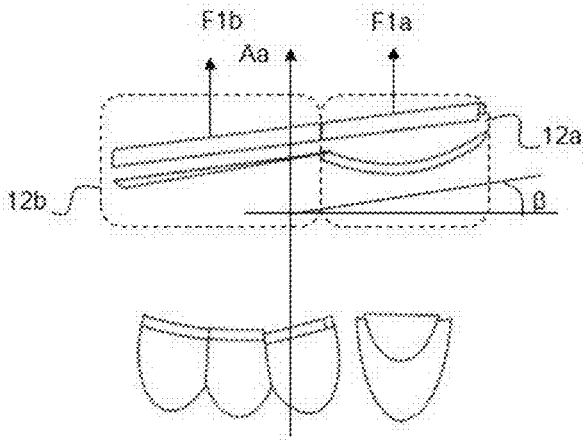
FIG. 7 is the top view of said luminous module of FIG. 3 without said at least one shield, said plurality of exit optical elements being positioned relative to said plurality of collectors in a second position, according to a non-limiting embodiment.

In a first non-limiting embodiment, said at least one exit optical element 12 is perpendicular to the optical axis Aa of the luminous module 1, i.e. it is not inclined relative to the vehicle axis OX in a horizontal plane when the luminous module 1 is in the position of assembly on the vehicle 2. As shown in FIG. 6, the two exit optical elements 12a, 12b depicted are not inclined. In a second non-limiting embodiment, said at least one exit optical element 12 has an angle of inclination β in said horizontal plane relative to the perpendicular to the optical axis Aa of the luminous module 1, i.e. it is inclined relative to the vehicle axis OX, the optical axis Aa being substantially parallel to the vehicle axis OX. As shown in FIG. 7 in top view, the two exit optical elements 12a, 12b depicted are inclined. The horizontal plane is a plane parallel to the ground containing the vehicle axis OX.

In one non-limiting embodiment, the angle of inclination β has a maximum value of 15°. In one non-limiting variant embodiment, the angle of inclination β is equal to 3°. An exit optical element 12 is thus obtained which is only very slightly inclined with respect to the vehicle axis OX. This makes it possible to maximize the range of travel in which the cut-off of the light beam F1 is not distorted. If the angle of inclination β is too inclined, the cut-off of the light beam F1 will in fact be distorted.

In one non-limiting embodiment, the luminous module 1 comprises a plurality of exit optical elements 12, of which one part 12a of the exit optical elements 12 is associated with a first portion F1a of said light beam F1 and the other part 12b of the exit optical elements 12 is associated with a second portion F1b of said light beam F1. As shown in FIG. 1 or FIG. 5, there are two exit optical elements 12, one 12a of which is associated with the first portion F1a of said light beam F1 and the other 12b of which is associated with the second portion F1b of said light beam F1. This makes it possible to produce a low beam. The first portion F1a represents the inclined cut-off referred to as "kink". It is otherwise referred to as the inclined cut-off F1a or cut-off F1a. The second portion F1b represents the flat cut-off referred to as "flat". It is otherwise referred to as the flat cut-off F1b or cut-off F1b. In the non-limiting example shown in FIGS. 1 and 2, one collector 1 is used to produce the first portion Fla ("kink") of the light beam F1 and three collectors 11 are used to produce the second portion F1b ("flat") of the light beam F1. This non-limiting embodiment of the plurality of exit optical elements 12 for forming a light beam F1 with an inclined cut-off and a flat cut-off is taken as a non-limiting example in the remainder of the description. Note that in this case, in one non-limiting embodiment, the two exit optical elements 12a and 12b have the same common longitudinal axis perpendicular to the vehicle axis OX.

The system for lateral relative movement 13 and the system for vertical movement 14 make it possible to combine a lateral movement and a vertical movement of the collectors 11 together with the associated light sources 10 in such a way as to allow the light beam F1 to move laterally and/or vertically. It will be recalled that it is the collectors 11/light sources 10/radiator assembly that moves, but for the sake of simplification reference will be made below only to the movement of the collectors 11. The movement which is lateral and/or vertical takes place inside the luminous module 1.

Figure 8:
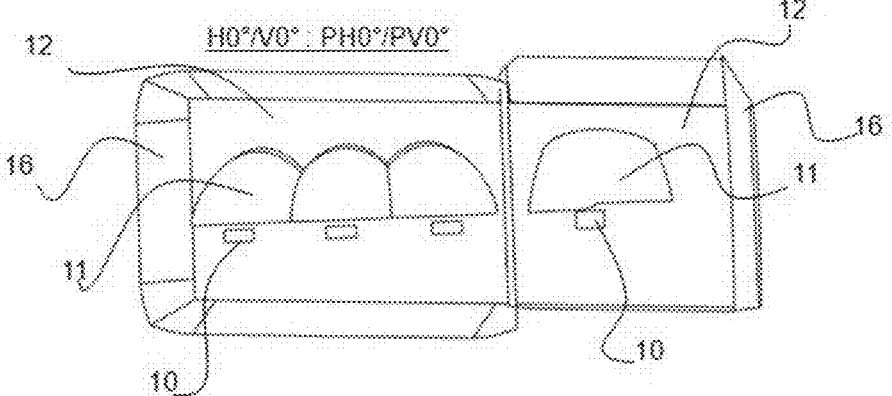
FIG. 8 is a rear view of said luminous module of FIG. 3, said plurality of collectors together with said plurality of light sources being positioned in a nominal horizontal position, according to a non-limiting embodiment.
Figure 9:
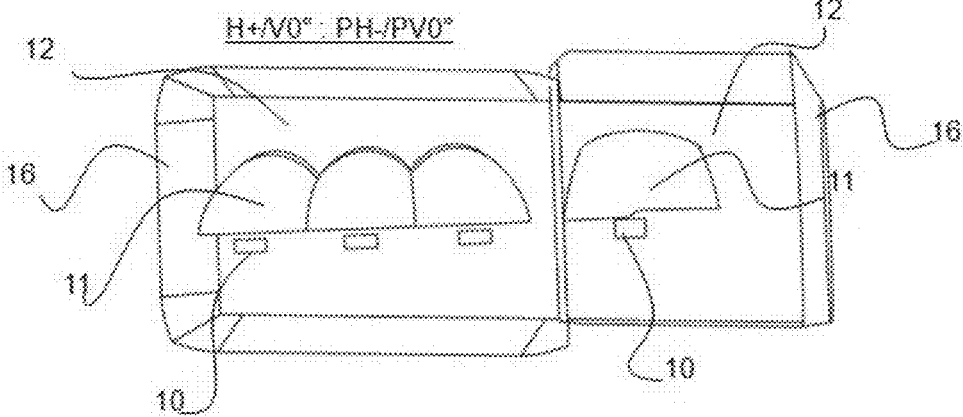
FIG. 9 is a rear view of said luminous module of FIG. 3, said plurality of collectors together with said plurality of light sources being positioned in a horizontal position located to the left of the nominal horizontal position of FIG. 8, according to a non-limiting embodiment.
Figure 10:
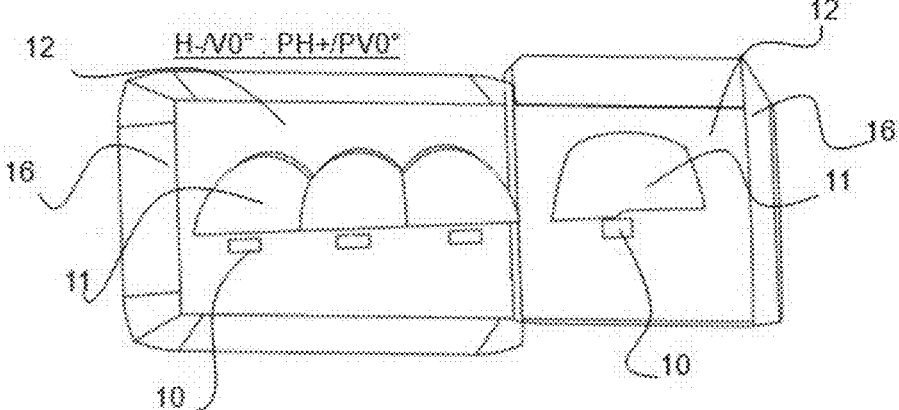
FIG. 10 is a rear view of said luminous module of FIG. 3, said plurality of collectors together with said plurality of light sources being positioned in a horizontal position located to the right of the nominal horizontal position of FIG. 8, according to a non-limiting embodiment.

As shown in FIGS. 8 to 10, the system for lateral relative movement 13 makes it possible to move the collectors 11 laterally relative to the exit optical elements 12, either:

to the left (position PH–) relative to a vertical plane containing the vehicle axis OX so as to have an exit beam F1 oriented toward the right H+ (FIG. 9 in rear view) relative to a nominal lateral position H0 of the light beam F1 (FIG. 8 in rear view), said nominal lateral position H0 of the light beam F1 corresponding to a nominal lateral position PH0° of the collectors 11, or to the right (position PH+) relative to said vertical plane so as to have an exit beam F1 oriented toward the left H– (FIG. 10 in rear view) relative to this nominal lateral position H0°. Note that the vertical plane is defined when the luminous module 1 is in the position of assembly on the motor vehicle 2.

Figure 11:
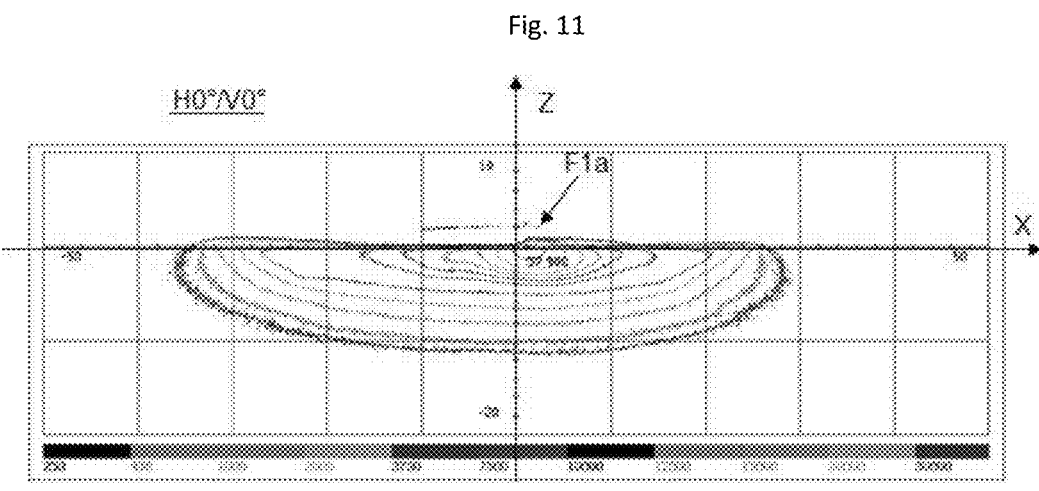
FIG. 11 is a graphic depiction of a luminous image of the light beam produced by the luminous module of FIG. 8, according to a non-limiting embodiment.
Figure 12:
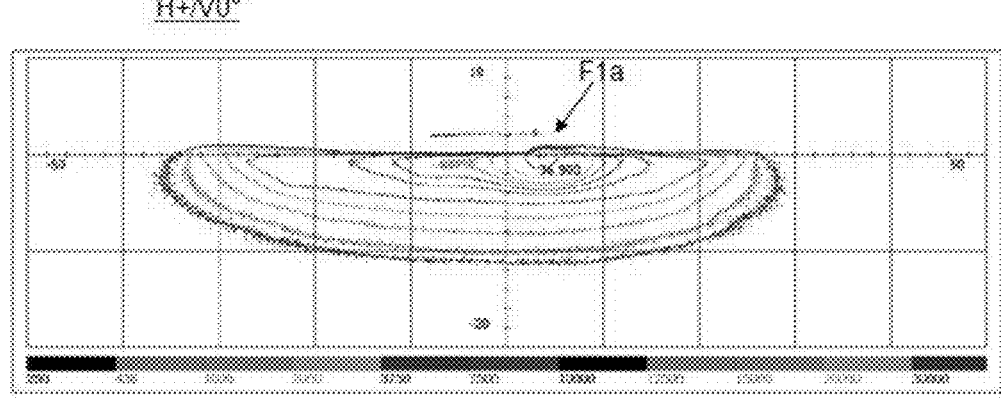
FIG. 12 is a graphic depiction of a luminous image of the light beam produced by the luminous module of FIG. 9, according to a non-limiting embodiment.
Figure 13:
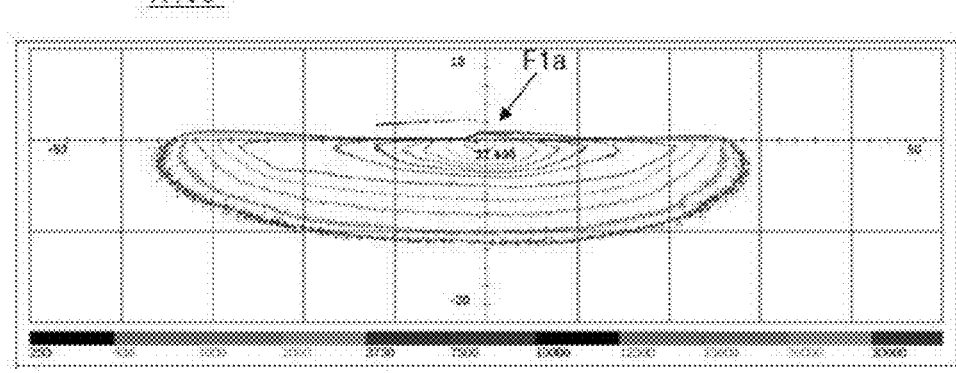
FIG. 13 is a graphic depiction of a luminous image of the light beam produced by the luminous module of FIG. 10, according to a non-limiting embodiment.

This makes it possible to obtain respectively a light beam F1 the light image of which is shown in isocandela in FIGS. 11 to 13. Each curve represents a constant level of light intensity referred to as isocandela. Generally, the nominal lateral position H0° is defined by the horizontal; and the horizontal is defined when the luminous module 1 is in its assembled orientation in the normal operating position. In other words, the horizontal is the plane of the road on which the motor vehicle 2 is traveling. Note in FIGS. 8 to 10 that the collectors 11 are positioned in a nominal vertical position PV0° corresponding to a nominal vertical position V0° of the light beam F1.

As can be seen, the inclined cut-off F1a of the light beam F1 in FIG. 12 is located further to the right H+ than that in FIG. 11 (nominal lateral position H0). Moreover, the cut-off Fla of the light beam F1 in FIG. 13 is located further to the left H– than that in FIG. 11. As will be seen below, the lateral movement is produced by virtue of a circular translation of the collectors 11. In one non-limiting embodiment, the lateral movement of the collectors 11 and the associated light sources 10 generates an angle of lateral travel of between plus or minus 5° and in particular between plus or minus 3° for the light beam F1. In one non-limiting variant embodiment, the angle of lateral travel is equal to plus or minus 3°. These values refer to the movement of the light beam F1 on the isocandela. Note that a lateral movement of 2 mm of the collectors 11 corresponds to a lateral travel of the light beam F1 of approximately 2°. Note that the lateral movement has no impact on the flat cut-off F1b.

Figures 14, 15, 16:
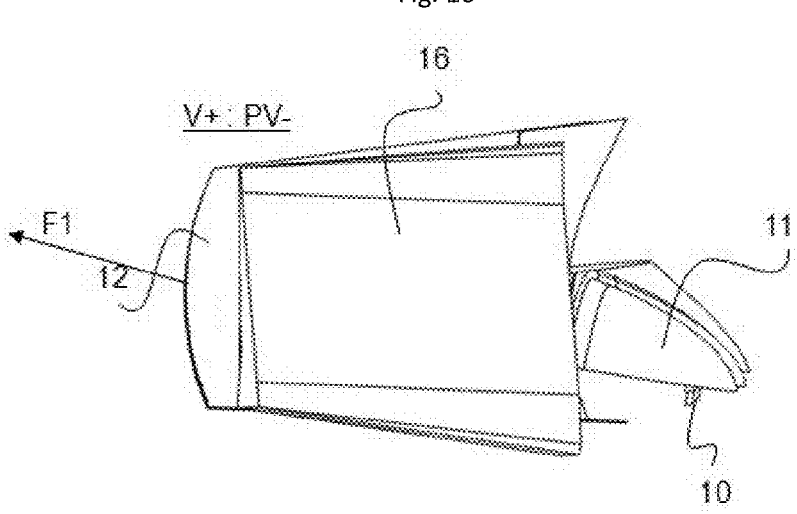
FIG. 14 is a side view of said luminous module of FIG. 3, said plurality of collectors together with said plurality of light sources being positioned in a nominal vertical position, according to a non-limiting embodiment.
FIG. 15 is a side view of said luminous module of FIG. 3, said plurality of collectors together with said plurality of light sources being positioned in a vertical position located above the nominal vertical position of FIG. 14, according to a non-limiting embodiment.
FIG. 16 is a side view of said luminous module of FIG. 3, said plurality of collectors together with said plurality of light sources being positioned in a vertical position located below the nominal vertical position of FIG. 14, according to a non-limiting embodiment.

As shown in FIGS. 14 to 16, the system for vertical relative movement 14 makes it possible to move the collectors 11 vertically relative to the exit optical elements 12, either:

upward (position PV+, otherwise referred to as the high position) relative to the horizontal plane parallel to the ground containing the vehicle axis OX so as to have a light beam F1 oriented downward V– (FIG. 15) relative to a nominal vertical position V0° (FIG. 14), or downward (position PV–, otherwise referred to as the low position) relative to said parallel horizontal plane so as to have a light beam F1 oriented upward V+ (FIG. 16) relative to this nominal vertical position V0°. Note that the horizontal plane is defined when the luminous module 1 is in the position of assembly on the motor vehicle 2.

This makes it possible to move the light beam F1 below the nominal vertical position V0° of the light beam F1 or above the nominal vertical position V0°. As will be seen below, the vertical relative movement is produced by virtue of a rotation of the collectors 11. In one non-limiting embodiment, the vertical relative movement of the collectors 11 generates an angle of vertical travel of between plus or minus 10° and in particular between plus or minus 7° for the light beam F1. In one non-limiting variant embodiment, the angle of vertical travel is substantially equal to plus or minus 7° for the light beam F1. This value refers to the movement of the light beam F1 on the isocandela. Note that with the vertical movement being produced by virtue of a rotation of axis of rotation AD (described below) at the level of the exit optical elements 12, a mechanical rotation of 1° corresponds to a vertical travel of the light beam F1 of approximately 1°.

FIGS. 17 to 19 and 23 to 25 show various horizontal and vertical positions of the collectors 11 relative to the exit optical elements 12. A nominal position PV0°/PH0° is defined by a nominal vertical position PV0° and by a nominal lateral position PH0° which corresponds to a nominal position V0°/H0° of said light beam F1 defined by a nominal vertical position V0° and by a nominal lateral position H0° of said light beam F1. The term "nominal position PV0°/PH0°" means the position of the light beam F1 set on a motor vehicle 2 all the dimensions of which are nominal. As will be seen below, when the collectors 11 move to the right, this directs the light beam F1 to the left, whereas when the collectors 11 move to the left, this directs the light beam F1 to the right. Furthermore, when the collectors 11 move upward, the light beam F1 is inclined downward, whereas when the collectors 11 move downward, the light beam F1 is inclined upward.

Figure 17:
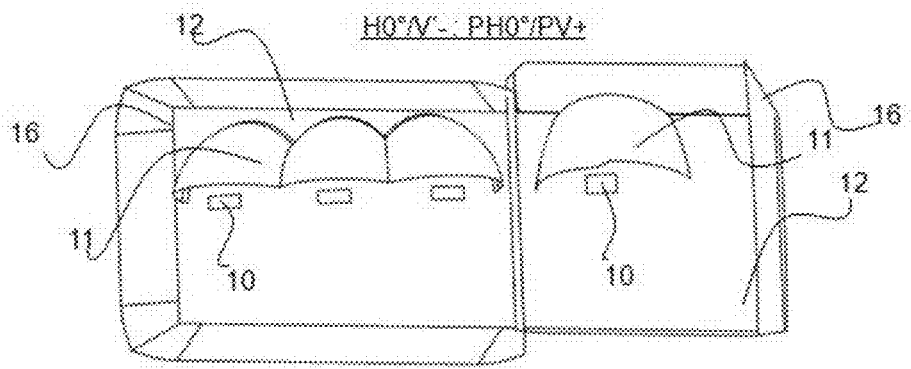
FIG. 17 is a rear view of said luminous module of FIG. 3, said plurality of collectors together with said plurality of light sources being positioned in the nominal horizontal position of FIG. 8 and in the vertical position of FIG. 15, according to a non-limiting embodiment.
Figure 18:
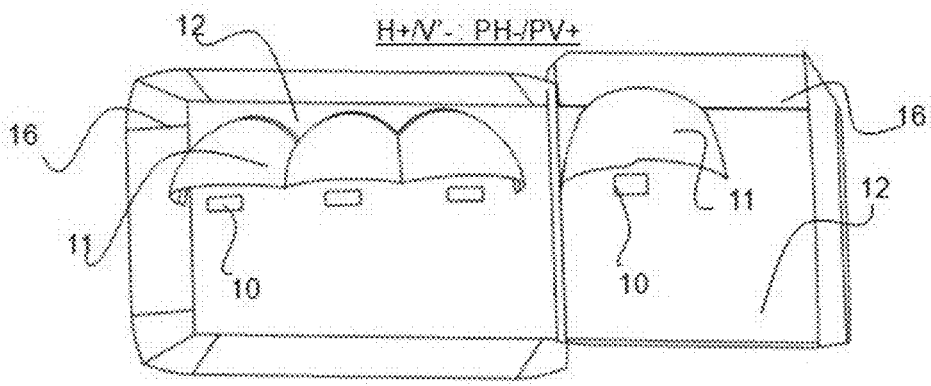
FIG. 18 is a rear view of said luminous module of FIG. 3, said plurality of collectors together with said plurality of light sources being positioned in the horizontal position of FIG. 9 and in the vertical position of FIG. 15, according to a non-limiting embodiment.
Figure 19:
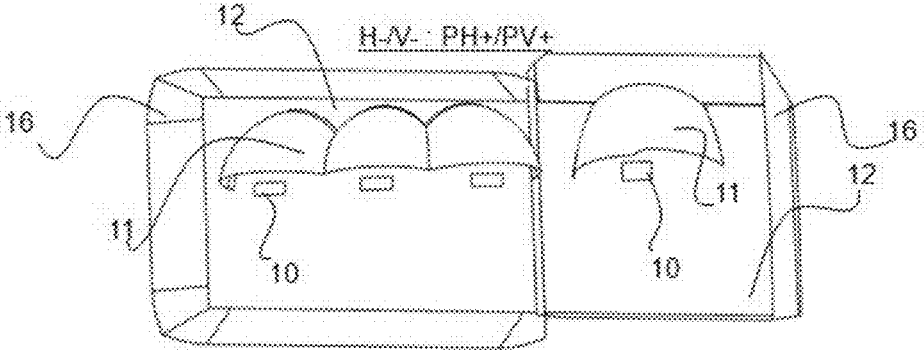
FIG. 19 is a rear view of said luminous module of FIG. 3, said plurality of collectors together with said plurality of light sources being positioned in the horizontal position of FIG. 10 and in the vertical position of FIG. 15, according to a non-limiting embodiment.
Figure 20:
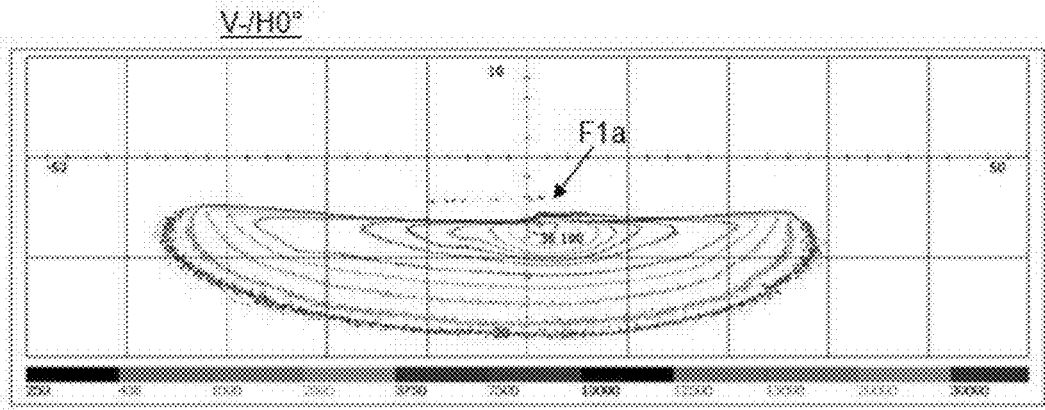
FIG. 20 is a graphic depiction of a luminous image of the light beam produced by the luminous module of FIG. 17, according to a non-limiting embodiment.
Figure 21:
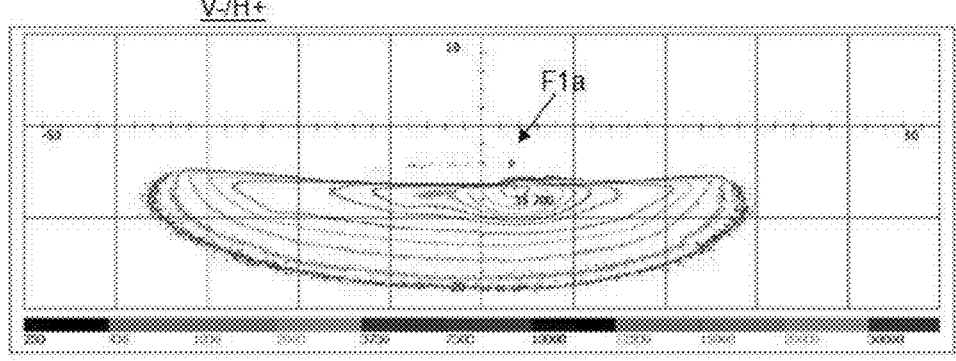
FIG. 21 is a graphic depiction of a luminous image of the light beam produced by the luminous module of FIG. 18, according to a non-limiting embodiment.
Figure 22:
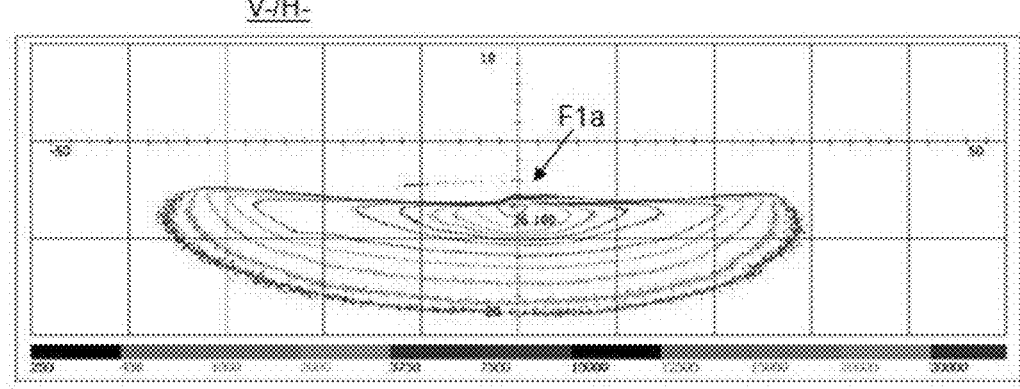
FIG. 22 is a graphic depiction of a luminous image of the light beam produced by the luminous module of FIG. 19, according to a non-limiting embodiment.

Thus, as shown in FIGS. 17 to 19, the collectors 11 are positioned in a vertical position PV+ located above the nominal vertical position PV0, otherwise referred to as the high position PV+. Furthermore, in FIG. 17, the collectors 11 are positioned in the nominal lateral position PH0°, while in FIG. 18 they are positioned in the left lateral position PH–, and in FIG. 19 they are positioned in the right lateral position PH+. This makes it possible to obtain respectively a light beam F1 the image of which is shown in FIGS. 20 to 22. As can be seen in these figures, the light beam F1 is located in a vertical position V– below the nominal vertical position V0°. Furthermore, the cut-off F1a of the light beam F1 in FIG. 21 is located further to the right H+ than that in FIG. 20 (nominal lateral position H0°). Moreover, the cut-off F1a of the light beam F1 in FIG. 22 is located further to the left H– than that in FIG. 20.

Figure 23:
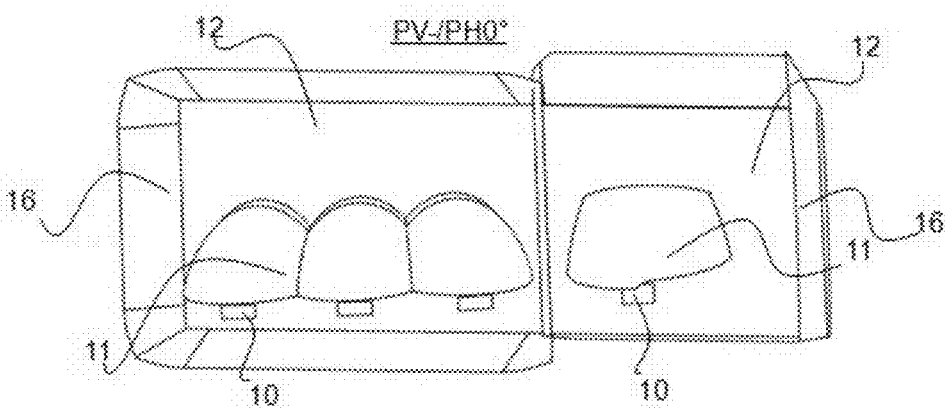
FIG. 23 is a rear view of said luminous module of FIG. 3, said plurality of collectors together with said plurality of light sources being positioned in the nominal horizontal position of FIG. 8 and in the vertical position of FIG. 16, according to a non-limiting embodiment.
Figure 24:
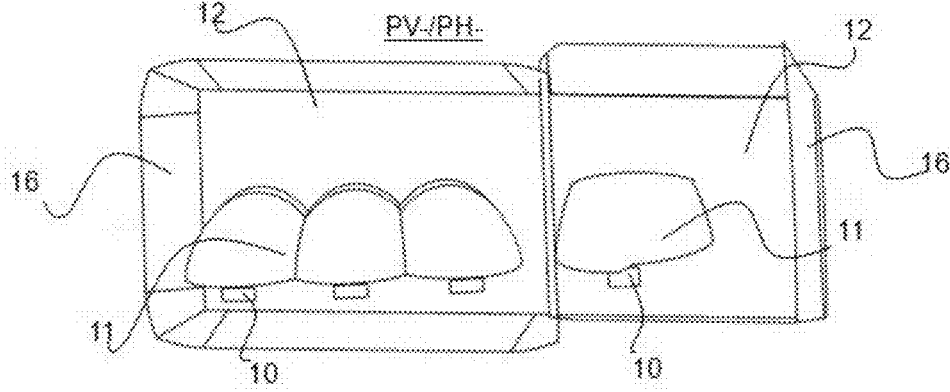
FIG. 24 is a rear view of said luminous module of FIG. 3, said plurality of collectors together with said plurality of light sources being positioned in the horizontal position of FIG. 9 and in the vertical position of FIG. 16, according to a non-limiting embodiment.
Figure 25:
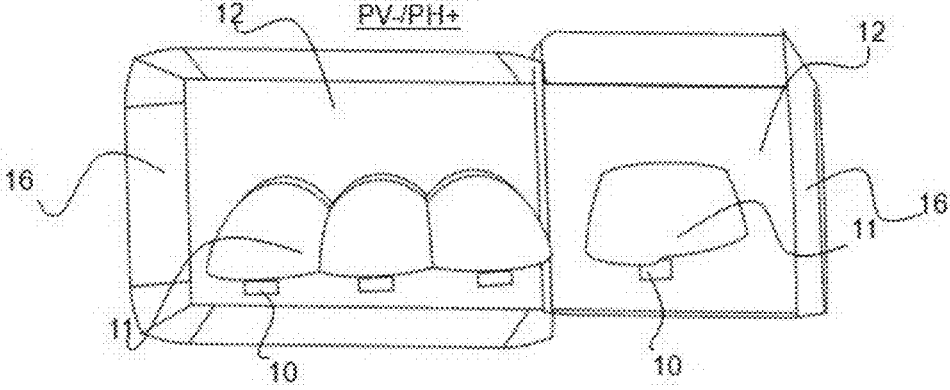
FIG. 25 is a rear view of said luminous module of FIG. 3, said plurality of collectors together with said plurality of light sources being positioned in the horizontal position of FIG. 10 and in the vertical position of FIG. 16, according to a non-limiting embodiment.
Figure 26:
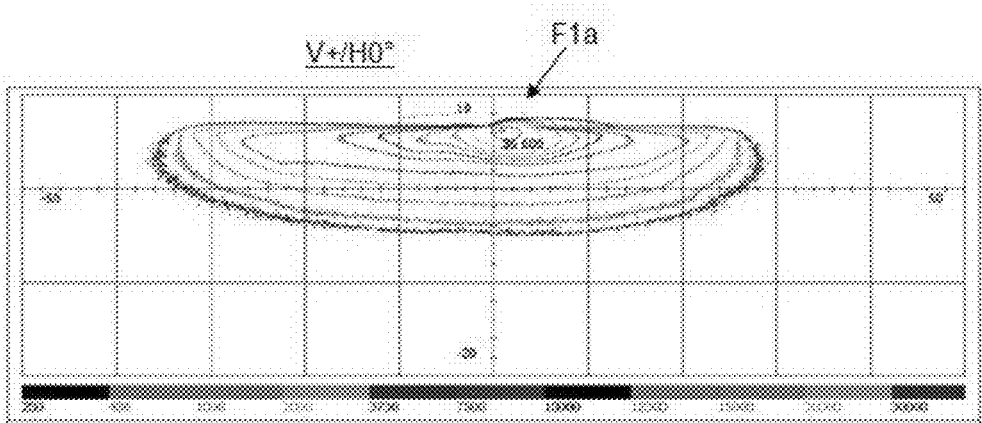
FIG. 26 is a graphic depiction of a luminous image of the light beam produced by the luminous module of FIG. 23, according to a non-limiting embodiment.
Figure 27:
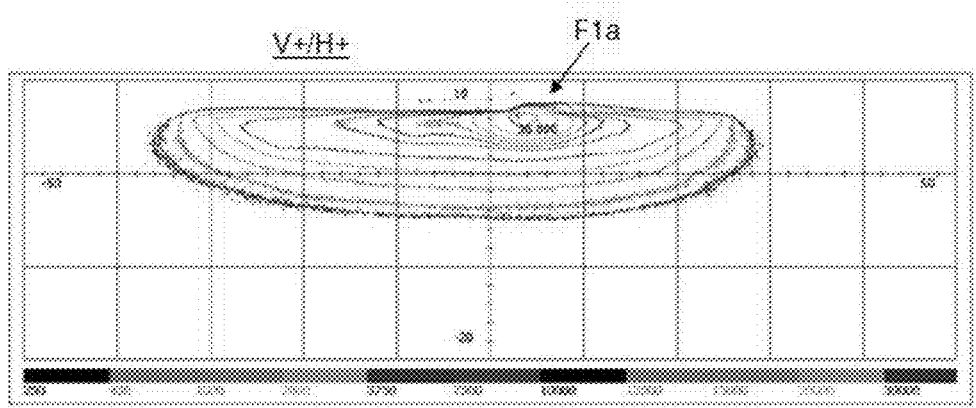
FIG. 27 is a graphic depiction of a luminous image of the light beam produced by the luminous module of FIG. 24, according to a non-limiting embodiment.
Figure 28:
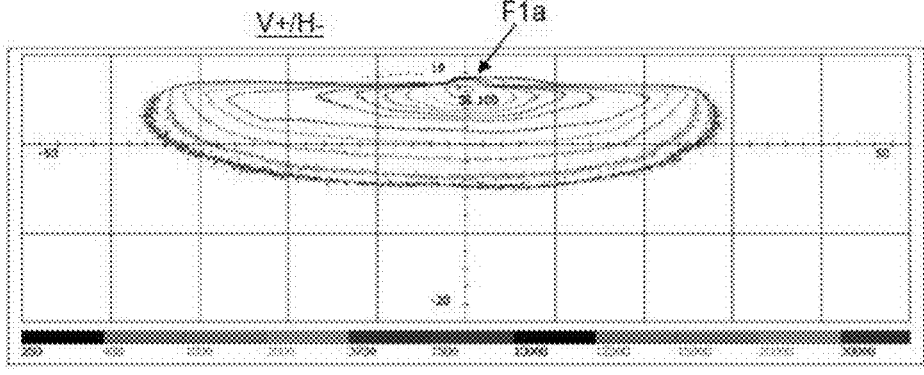
FIG. 28 is a graphic depiction of a luminous image of the light beam produced by the luminous module of FIG. 25, according to a non-limiting embodiment.

Thus, as shown in FIGS. 23 to 25, the collectors 11 are positioned in a vertical position PV– located below the nominal vertical position V0°, otherwise referred to as the low position PV–. Furthermore, in FIG. 23, the collectors 11 are positioned in the nominal lateral position PH0°, while in FIG. 24 they are positioned in the left lateral position PH–, and in FIG. 25 they are positioned in the right lateral position PH+. This makes it possible to obtain respectively a light beam F1 the image of which is shown in FIGS. 26 to 28. As can be seen in these figures, the light beam F1 is located in a vertical position V+ above the nominal vertical position V0°. Furthermore, the cut-off F1a of the light beam F1 in FIG. 27 is located further to the right H+ than that in FIG. 26 (nominal lateral position H0°). Moreover, the cut-off F1a of the light beam F1 in FIG. 28 is located further to the left H– than that in FIG. 26.

To sum up:

the nominal lateral position PH0° of the collectors 11 corresponds to the nominal lateral position H0° of the light beam F1, the lateral position PH– of the collectors 11 corresponds to the lateral position H+ of the light beam F1, the lateral position PH+ of the collectors 11 corresponds to the lateral position H– of the light beam F1, the nominal vertical position PV0° of the collectors 11 corresponds to the nominal vertical position V0° of the light beam F1, the vertical position PV– of the collectors 11 corresponds to the vertical position V+ of the light beam F1, and the vertical position PV+ of the collectors 11 corresponds to the vertical position V– of the light beam F1.

The system for lateral relative movement 13 and the system for vertical relative movement 14 are now described in detail below from the kinematic viewpoint with reference to FIGS. 29 to 41. FIGS. 29 to 41 also depict the exit optical element 12 and the collectors 11 forming the reflector.

Figure 29:
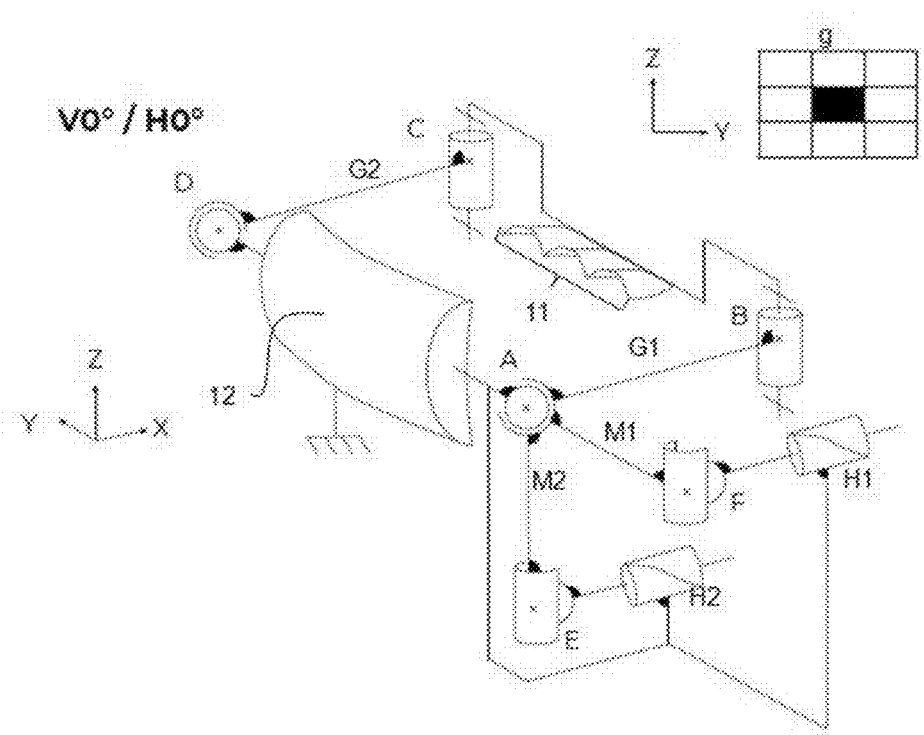
FIG. 29 is a kinematic perspective view of the mechanical elements of the system for lateral relative movement of said luminous module of FIG. 1, and of the mechanical elements of a system for vertical relative movement of said luminous module of FIG. 1, when they are at rest in a nominal lateral position and in a nominal vertical position, according to a non-limiting embodiment.

As shown in FIG. 1 and FIG. 29, the system for lateral relative movement 13 comprises:

a pivot connection of center A and axis AE and a ball joint of center D which are arranged laterally on either side of said at least one exit optical element 12, a pivot connection of center B and a pivot connection or ball joint of center C which are arranged on either side of the plurality of collectors 11, the pivot connection or connections having an axis parallel to AE, two parallel connecting rods G1, G2 with the same length, each respectively connecting the pivot connection of center A and the pivot connection of center B, and the ball joint of center D and the pivot connection or ball joint of center C in such a way as to form a parallelogram ABCD, a primary actuator H1 configured to rotate the pivot connection of center A in a substantially transverse direction AD in such a way as to transversely move said plurality of collectors 11, a primary annular linear connection of center F connecting said primary actuator H1 to one of said connecting rods G1, G2 to form a primary crank M1.

More specifically, the centers A, B, C, D form the corners of the parallelogram ABCD, and the parallelogram ABCD is formed by the segments AB, BC, CD and DA. The assembly formed by the two connecting rods G1, G2, the exit optical element 12, and the collectors 11 is loosely referred to as the parallelogram ABCD.

The connections of center A, B, C, D, E, F are loosely referred to as the respective connections A, B, C, D, E, F. The primary crank M1 is otherwise referred to as the lateral thrust crank M1 or lateral crank M1. The axis AE passes through the centers A and E.

It will be borne in mind that a ball joint can rotate in all directions whereas a pivot connection rotates about one axis and cannot move in translation.

The transverse movement of the plurality of collectors 11 is a circular translational movement over a small angular extent. The circular translational movement is a translation along a path which is a portion of a circle. It will be borne in mind that the angle of lateral travel is between plus or minus 5° and in particular between plus or minus 3° for the light beam F1.

Note that in FIG. 29, the exit optical element 12 is connected to the symbol representing a ground which means that said exit optical element 12 is fixed relative to the motor vehicle 2. It does not move and remains immobile, whereas the collectors 11 will move. Note that pivot connections which are rotary connections are known for their reliability. Unlike sliding systems, there is no risk of them sticking or jamming. As a trade off, there is circular translational movement (instead of rectilinear translation). However, when the situation involves a small angular travel and nominally the parallelogram ABCD is a rectangle, then circular translation is close to rectilinear translation.

The lateral thrust crank M1 connects the primary annular linear connection F to one of the connecting rods G1, G2 in such a way as to form the lever arm AF (for G1) or to form the lever arm DF (for G2). The crank M1 is rigidly coupled to one of the connecting rods G1, G2, in this case G1 in the non-limiting example illustrated.

In one non-limiting embodiment, the collectors 11, the exit optical element 12 and said connecting rods G1, G2 are configured to take up a position PH0° in which said parallelogram ABCD forms a rectangle. In one non-limiting variant embodiment, this position is the nominal position PH0° described above. This allows the most lateral movement possible without an axial component. This makes it possible to have a distance between the collectors 11 and the associated exit optical elements 12 which varies slightly.

The parallelogram ABCD is deformable in that the angles DCB, CBA may change, but the sides are of the same length with AB=DC and AD=BC. The straight line passing through the center of the pivot connection A and the center of the annular linear connection F, and the straight line passing through the center of the pivot connection A and the center of the pivot B are perpendicular to one another.

The two connecting rods G1, G2 are otherwise referred to as the lateral connecting rods G1, G2. Each connecting rod G1, G2 rotates relative to the axis AE, and to an axis parallel to AE passing through the ball joint D, respectively. The connecting rods G1, G2 are parallel to one another and have the same length (AB=CD). The axis AE passes through the centers A and E.

The primary actuator H1 is otherwise referred to as the lateral actuator H1. In one non-limiting embodiment, the lateral actuator H1 is a manual screw which is adjusted in the factory or in the workshop. There is therefore a screw-nut connection in this case. This makes it possible to properly center the light beam F1 on the motor vehicle 2 while taking into account the manufacturing tolerances. The primary actuator H1 can move forward or backward.

As the lateral movement, otherwise referred to as transverse movement, of the plurality of collectors 11 is a circular translational movement, the primary actuator H1 rotates the pivot connection of center A in a substantially transverse direction AD. Thus, the coupling of the pivot connection A and the ball joint D makes it possible to define an axis AD (passing through the centers A and D) for the lateral movement. Generally, the transverse direction AD corresponds to the horizontal direction when the module is mounted on the motor vehicle 2.

In one non-limiting embodiment, said pivot connection of center A and axis AE is produced by means of a ball joint of center A and a secondary annular linear connection of center E. The center A and the center E are not coincident. The secondary annular linear connection E fixes the direction in which rotation will take place about the ball joints A and D. The ball joint A and the secondary annular linear connection E form an equivalent pivot.

The two pivot connections B, C have an axis of rotation parallel to the axis AE. This allows the parallelogram ABCD to be deformable so as to generate the lateral movement.

Note that an annular linear connection is shown schematically by a ball interacting in a hollow cylinder. Note also that an annular linear connection is a ball joint capable of translating in a predetermined direction. In one non-limiting embodiment, the predetermined direction has an axis AE.

Thus, in one non-limiting embodiment, the primary annular linear connection F has an axis parallel to the axis AE.

This creates slight hyperstaticity during lateral movement of the system for lateral relative movement 13, but this is managed thanks to the flexibility of the components, the operating clearances and the small amplitude of the deformations necessary.

To be specific, during lateral movement, the female part of the primary annular linear connection F describes a circle (in the plane ABD, of center A), since the connecting rod G1 rotates about the axis AE. This female part becomes misaligned along Y relative to the male part (ball) which necessarily remains aligned with the axis of the lateral actuator H1. However, said movement is minimal. For example, with a lever arm AF of 50 mm and an extent of 3°, the movement along Y is ~0.07 mm. The flexibility of the components and the operating clearances are capable of withstanding this variation. If the opposite configuration (annular linear connection of axis AF) is selected, there is no longer any hyperstaticity in the lateral movement. The ball simply moves by 0.07 mm in the female part of the connection (this is the usual role of annular linear connections in a headlamp adjustment system). On the other hand, there is greater hyperstaticity in the combined lateral and vertical movement.

In FIG. 29, the collectors 11 are in the nominal lateral position PH0° and in the nominal vertical position PV0°, referred to as the nominal position PV0°/PH0° which corresponds to the light beam F1 in a nominal position V0°/H0° illustrated by the black square on the movement grid g. By extension, the mechanical elements of the system for lateral 13/vertical 14 relative movement are said to be in the nominal position PV0°/PH0°. For the sake of simplification, only the nominal position V0°/H0° of the light beam F1 has been shown.

Figure 30:
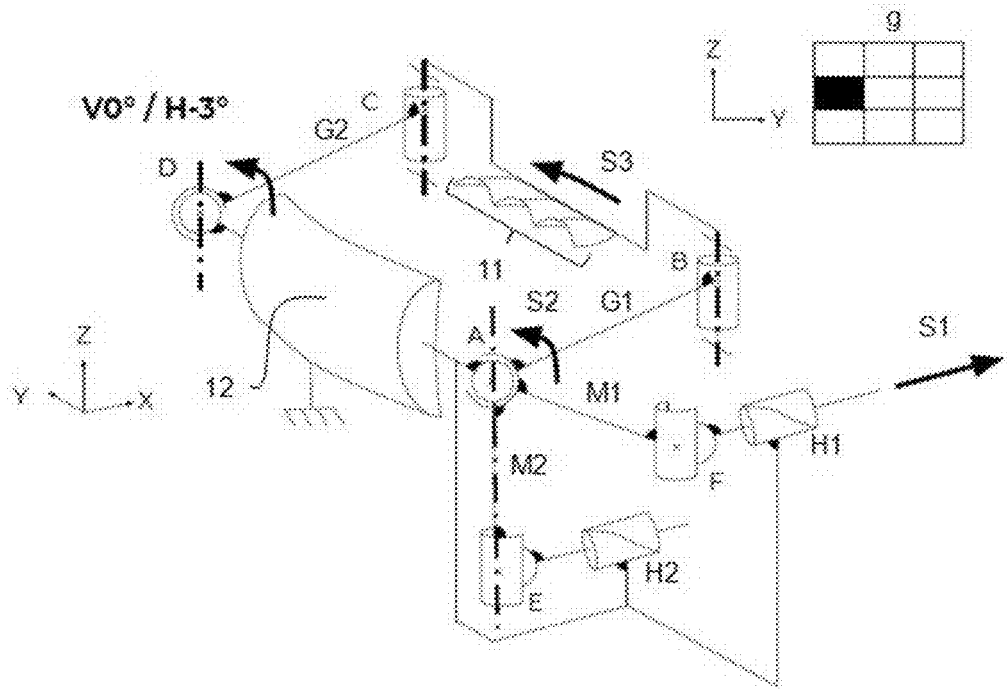
FIG. 30 is a kinematic view of the mechanical elements of the system for vertical relative movement of FIG. 29, when they are in lateral motion, according to a non-limiting embodiment.

In FIG. 30, the collectors 11 perform a circular translational movement which makes it possible to move the light beam F1 laterally to the left as indicated by the black square in the movement grid g shown. As shown in FIG. 30, pulling on the primary actuator H1 (in practice, manually unscrewing the screw) pulls on the primary annular linear connection F, which generates a rotation about the axis AE which causes all of the collectors 11 to move to the right in the non-limiting example illustrated, such that the light beam F1 moves to the left as indicated by the black square in the movement grid g shown. To move all of the collectors 11 to the left such that the light beam F1 moves to the right, it is necessary to push on the primary actuator H1 (in practice, manually tighten the screw).

Thus, the linear movement (arrow referenced S1) of the lateral actuator H1 causes a rotation (arrow referenced S2) of the connecting rod G1 about the axis AE passing through the center of the ball joint A and the center of the secondary annular linear connection E. This then results in a deformation of the parallelogram ABCD. This results in a circular translational movement (arrow referenced S3) of the reflector formed by the plurality of collectors 11 (which, over the entire path, remains parallel to its nominal starting position PV0° shown in FIG. 29).

Figure 31:
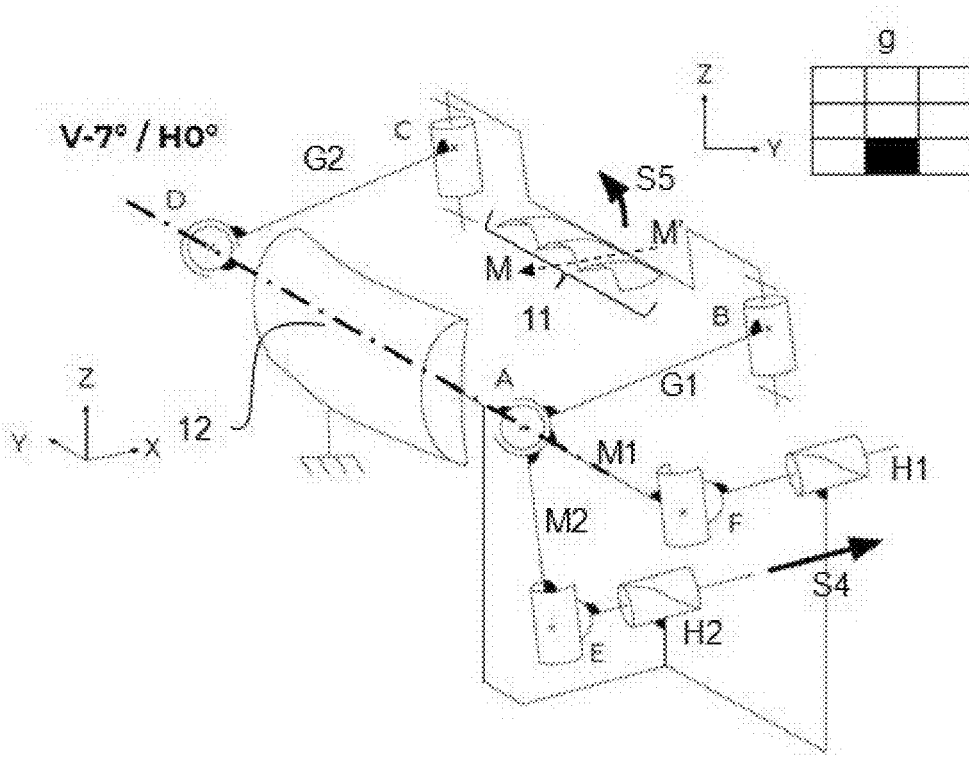
FIG. 31 is a kinematic view of the mechanical elements of the system for vertical relative movement of FIG. 29, when they are in vertical motion, according to a non-limiting embodiment.

As shown in FIG. 2 and FIG. 31, the system for vertical relative movement 14 comprises:

the pivot connection of center A and axis AE and a ball joint of center D which are arranged on either side of said at least one exit optical element 12, the pivot connection of center B and the pivot connection or ball joint of center C which are arranged on either side of the plurality of collectors 11, the pivot connection or connections having an axis parallel to AE, the two parallel connecting rods G1, G2 with the same length, each connecting the centers A, D and the centers B, C located on the same side in such a way as to form a parallelogram ABCD, said primary annular linear connection of center F.

For the system for vertical relative movement 14, in one non-limiting embodiment, said primary annular linear connection F has an axis parallel to the axis AE.

For the system for vertical movement 14, in one non-limiting embodiment, the pivot connection of center A and axis AE is produced by means of a ball joint of center A and an annular linear connection of center E. In one non-limiting embodiment, the secondary annular connection E has an axis AE.

Figure 32:
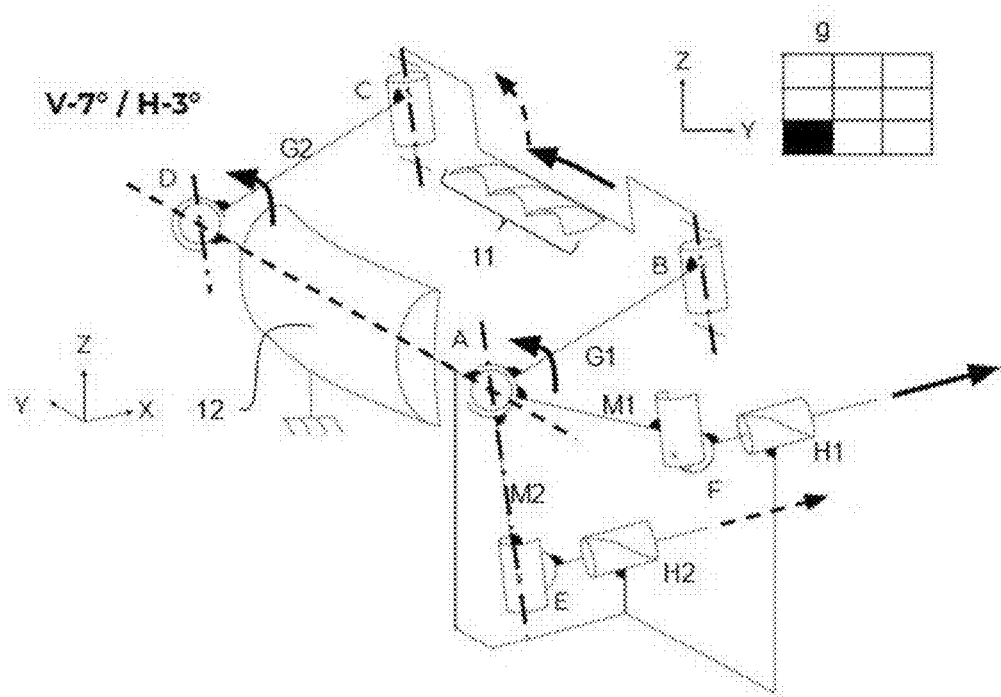
FIG. 32 is a kinematic view of the mechanical elements of the system for lateral relative movement and of the mechanical elements of the system for vertical relative movement of FIG. 29, when they are in vertical and lateral motion, according to a non-limiting embodiment.

For the vertical movement system 14, the primary annular linear connection F is on the axis AD passing through the centers A and D when said collectors 11 are in the nominal lateral position PH0° (as shown in FIG. 31). This allows the collectors 11 to rotate about the axis AD. Thus, the coupling of the ball joint A and the ball joint D makes it possible to define an axis of rotation AD for the vertical movement. Note that when not in the nominal lateral position PH0°, the primary annular linear connection F is not on the axis AD (as shown in FIG. 32).

The annular linear connection of center E connects a secondary actuator H2 to one of said connecting rods G1, G2 to form a secondary crank M2, said secondary actuator H2 being configured to rotate the plurality of collectors 11 about the axis AD. The secondary crank M2 is otherwise referred to as the vertical thrust crank M2 or vertical crank M2.

Thus, the system for vertical movement 14 further comprises said secondary actuator H2. The secondary actuator H2 is otherwise referred to as the vertical actuator H2.

Note that the system for vertical movement 14 uses the ball joints A, D, the pivot connections B, C and the connecting rods G1, G2 already used by the system for lateral relative movement 13. The system for lateral relative movement 13 and the system for vertical movement 14 thus share common elements. This results in a compact overall movement system.

The vertical thrust crank M2 connects the secondary annular linear connection E to one of the connecting rods G1, G2 in such a way as to form the lever arm AE (for G1) or to form the lever arm DE (for G2). The crank M2 is rigidly coupled to one of the connecting rods G1, G2, in this case G1 in the non-limiting example. In another non-limiting example, the crank M2 may be coupled to a connecting rod G1, G2 which is different from that of M1.

The straight line passing through the center of the ball joint A and the center of the annular linear connection E, and the straight line passing through the center of the ball joint A and the center of the pivot connection B are perpendicular to one another. This allows lateral adjustment which is absolutely in a horizontal plane when in the nominal vertical position PV0°.

In non-limiting embodiments, the vertical actuator H2 is a manual screw which is adjusted in the factory or an electric actuator which when the motor vehicle 2 is in operation thus makes it possible to correct the attitude of the motor vehicle 2 dynamically, or a combination of the two. The electric actuator comprises an electronic motor. The secondary actuator H2 can move forward or backward. It is configured to rotate the ball joint A in a vertical direction in such a way as to pivot said plurality of collectors 11 about the axis AD. It thus allows a rotational movement of the collectors 11 about the axis AD.

In FIG. 31, the collectors 11 perform a rotational movement which makes it possible to move the light beam F1 vertically downward as indicated by the black square in the movement grid g shown. As shown in FIG. 31, pulling on the vertical actuator H2 pulls on the secondary annular linear connection E, which generates a rotation about an axis AD which causes all of the collectors 11 to move such that they move upward (the axis MM' of the collectors 11 being inclined downward), such that the light beam F1 is oriented downward as indicated by the black square in the movement grid g shown. To move all of the collectors 11 so that they move downward such that the light beam F1 is inclined upward, it is necessary to push on the secondary actuator 142.

Thus, the linear movement (arrow referenced S4) of the vertical actuator H2 causes a rotation (arrow referenced S5) of the assembly made up of the reflector (formed by the collectors 11) and the two connecting rods G1, G2 about the axis passing through the center of the two ball joints A and D. This axis AD is substantially perpendicular to the longitudinal axis of the vehicle OX.

In FIG. 32, the collectors 11 perform a circular translational movement and also a rotational movement, which makes it possible to move the light beam F1 laterally to the left and vertically downward as indicated by the black square in the movement grid g shown. The lateral actuator H1 and the vertical actuator H2 are thus both activated. Note that for lateral movement or for vertical movement, the distance between the two pivot connections C and B remains the same.

FIGS. 33 to 41, showing top and side views, depict the various possible positions of the collectors 11 and consequently of the light beam F1. The figures show the switch from one position to another. In the non-limiting examples shown in these FIGS. 33 to 41, for the sake of simplification, only three collectors 11 and a single exit element 12 have been shown.

Figure 33:
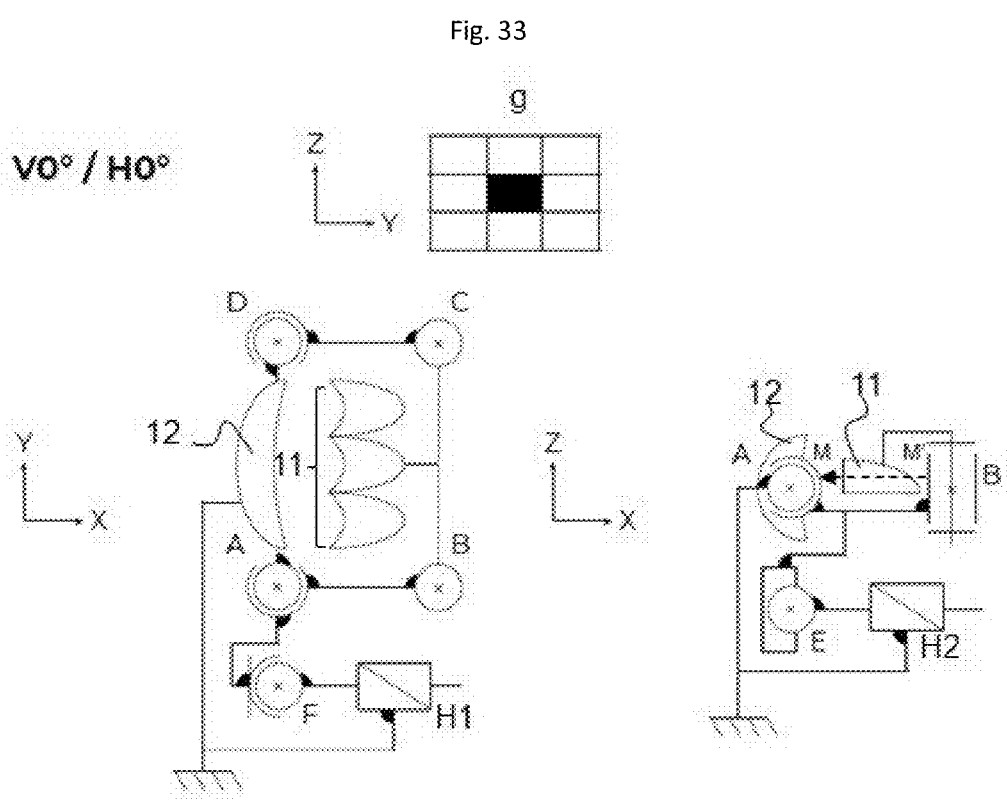
FIG. 33 is a kinematic top and side view of the mechanical elements of the system for lateral relative movement and of the mechanical elements of the system for vertical relative movement of said luminous module of FIG. 29, when they are at rest in a nominal lateral position and in a nominal vertical position, according to a non-limiting embodiment.

FIG. 33 shows the nominal position V0°/H0° of the light beam F1 and therefore the nominal position PV0°/PH0° of the collectors. For the sake of clarity, only the vertical and lateral position of the light beam F1 is indicated in the figures.

Figure 34:
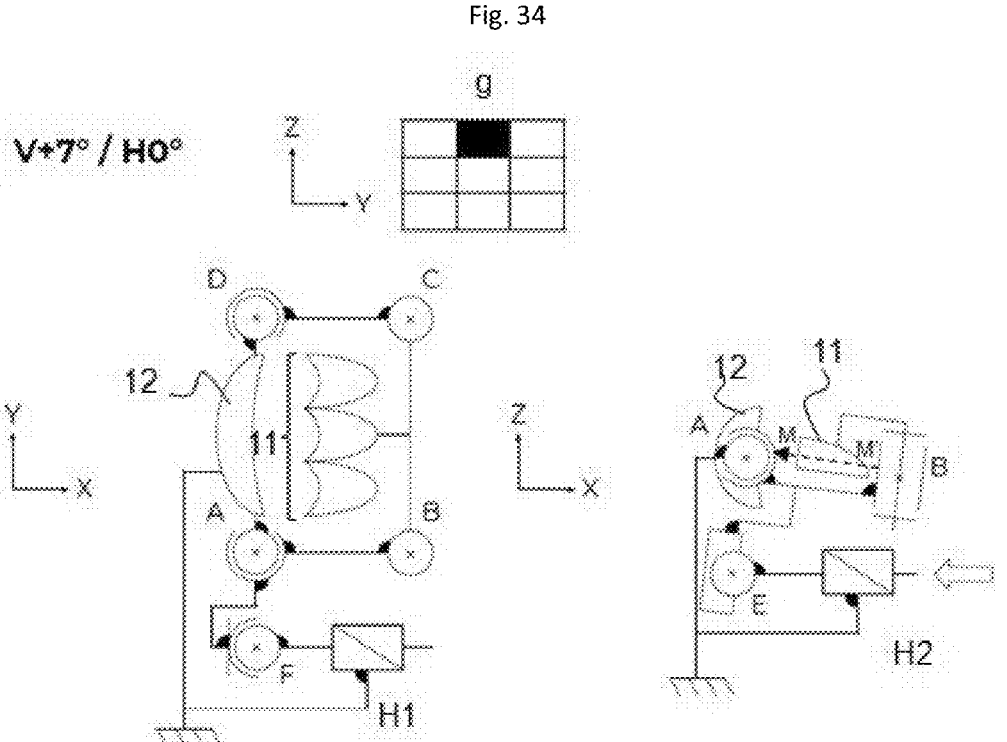
FIG. 34 is a kinematic view of the mechanical elements of the system for vertical relative movement of FIG. 29, when said plurality of collectors together with said plurality of light sources are in a vertical position located below the nominal vertical position of FIG. 33, and of the mechanical elements of the system for lateral relative movement of FIG. 29, when said plurality of collectors together with said plurality of light sources are in the nominal lateral position of FIG. 33, according to a non-limiting embodiment.

FIG. 34 shows a high vertical position V+7° and a nominal lateral position H0° of the light beam F1. In the non-limiting example, the collectors 11 are positioned 7° below the nominal vertical position PV0° and in the nominal lateral position PV0°. In the side view, it can be seen that by pushing on the vertical actuator H2, the collectors 11 move downward to the low position (their axis MM' is inclined upward) such that the light beam F1 is inclined upward and thus goes from the nominal vertical position V0° to the high vertical position V+7°, whereas the exit optical element 12 has not moved. The light beam F1 which exits the exit optical element 12 will thus be oriented upward and centered laterally as shown by the black square in the grid g shown.

Figures 35, 36:
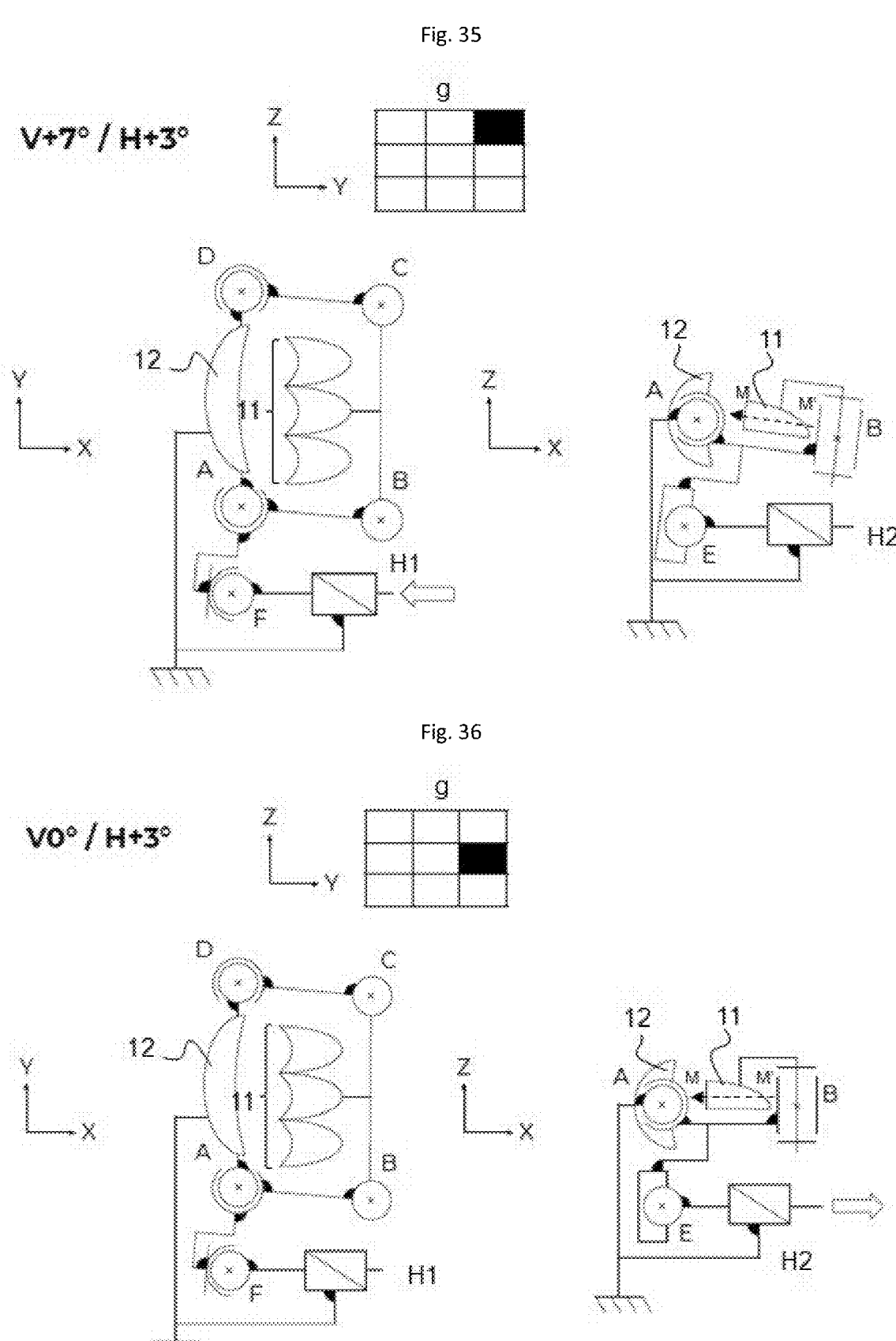
FIG. 35 is a kinematic view of the mechanical elements of the system for vertical relative movement of FIG. 29, when said plurality of collectors together with said plurality of light sources are in a vertical position located below the nominal vertical position of FIG. 33, and of the mechanical elements of the system for lateral relative movement of FIG. 29, when said plurality of collectors together with said plurality of light sources are in a lateral position located to the left of the nominal lateral position of FIG. 33, according to a non-limiting embodiment.
FIG. 36 is a kinematic view of the mechanical elements of the system for vertical relative movement of FIG. 29, when said plurality of collectors together with said plurality of light sources are in the nominal vertical position of FIG. 33, and of the mechanical elements of the system for lateral relative movement of FIG. 29, when said plurality of collectors together with said plurality of light sources are in a lateral position located to the left of the nominal lateral position of FIG. 33, according to a non-limiting embodiment.

FIG. 35 shows a high vertical position V+7° and a right-hand lateral position H+3° of the light beam F1. In the non-limiting example, the collectors 11 are positioned 7° below the nominal vertical position PV0° and to the left of the nominal lateral position PH0°. They remain in the low position. In the top view, it can be seen that by pushing on the lateral actuator H1, the collectors 11 move to the left such that the light beam F1 is positioned 3° to the right of the nominal lateral position H0°, whereas the exit optical element 12 has not moved. In the side view, it can be seen that the collectors 11 remain in the low position such that the light beam F1 remains oriented upward V+7°, whereas the exit optical element 12 has not moved. The light beam F1 which exits the exit optical element 12 will thus be oriented to the right and upward as shown by the black square in the grid g shown.

FIG. 36 shows a nominal vertical position V+0° and a right-hand lateral position H+3° of the light beam F1. In the top view, it can be seen that the collectors 11 remain to the left such that the light beam F1 remains oriented to the right H+3°, whereas the exit optical element 12 has not moved. To return to the nominal vertical position V0°, in the side view, it can be seen that we pull on the vertical actuator H2. The collectors 11 move back up to the nominal vertical position (their axis MM' returns to horizontal) such that the light beam F1 returns to its nominal vertical position V0°. The light beam F1 which exits the exit optical element 12 will thus be oriented to the right and centered vertically as shown by the black square in the grid g shown.

Figures 37, 38:
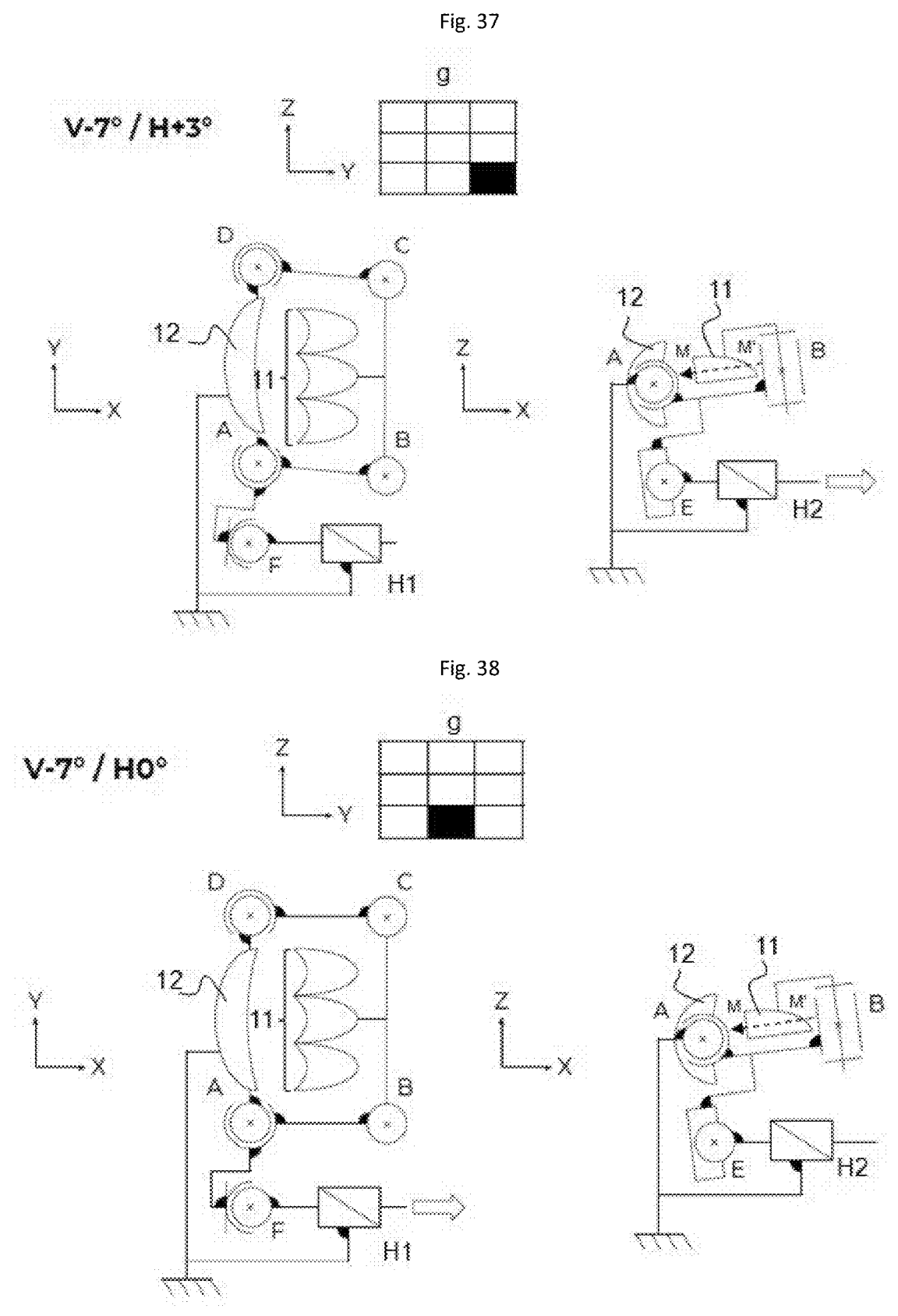

FIG. 37 shows a low vertical position V−7° and a right-hand lateral position H+3° of the light beam F1. In the top view, it can be seen that the collectors 11 remain to the left such that the light beam F1 remains to the right H+3°, whereas the exit optical element 12 has not moved. To go to the low vertical position V−7°, in the side view, it can be seen that we pull on the vertical actuator H2 again. The collectors 11 move back up to the high position (their axis MM' is inclined downward) such that the light beam F1 goes from the nominal vertical position V0° to the low vertical position V−7°. The light beam F1 which exits the exit optical element 12 will thus be oriented downward and to the right as shown by the black square in the grid g shown.

FIG. 38 shows a low vertical position V−7° and a nominal lateral position H0° of the light beam F1. To return to the nominal lateral position H0, in the top view, it can be seen that we pull on the lateral actuator H1. The collectors 11 move to the right such that the light beam F1 goes from the right-hand lateral position H+3° to the nominal lateral position H0, whereas the exit optical element 12 has not moved. In the side view, it can be seen that the collectors 11 remain in the high position (their axis MM' remains inclined downward). The light beam F1 which exits the exit optical element 12 will thus be oriented downward and centered laterally as shown by the black square in the grid g shown.

Figures 39, 40:
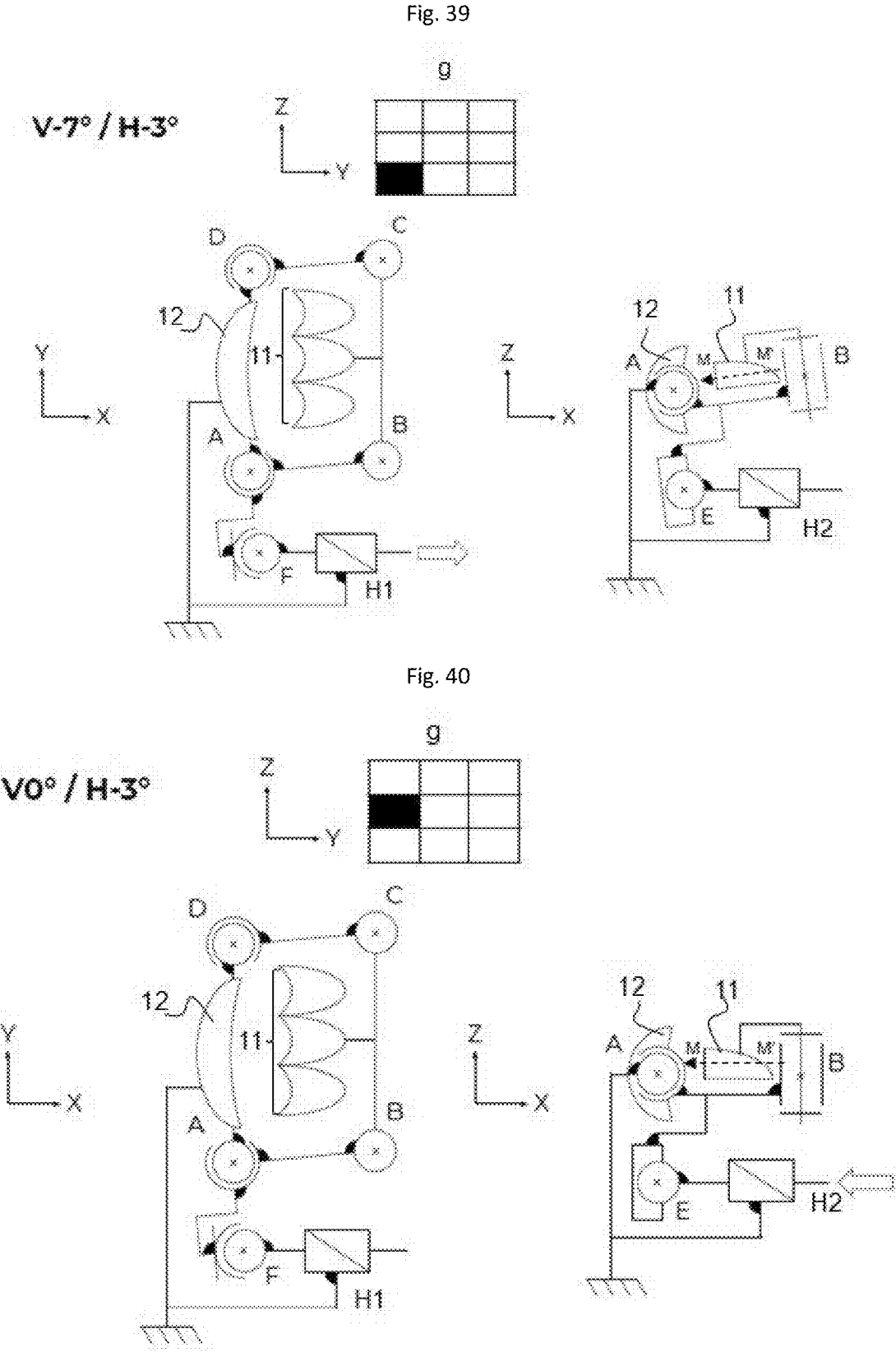
FIG. 39 is a kinematic view of the mechanical elements of the system for vertical relative movement of FIG. 29, when said plurality of collectors together with said plurality of light sources are in a vertical position located above the nominal vertical position of FIG. 33, and of the mechanical elements of the system for lateral relative movement of FIG. 29, when said plurality of collectors together with said plurality of light sources are in a lateral position located to the right of the nominal lateral position of FIG. 33, according to a non-limiting embodiment.
FIG. 40 is a kinematic view of the mechanical elements of the system for vertical relative movement of FIG. 29, when said plurality of collectors together with said plurality of light sources are in the nominal vertical position of FIG. 33, and of the mechanical elements of the system for lateral relative movement of FIG. 29, when said plurality of collectors together with said plurality of light sources are in a lateral position located to the right of the nominal lateral position of FIG. 33, according to a non-limiting embodiment.

FIG. 39 shows a low vertical position V−7° and a left-hand lateral position H−3° of the light beam F1. To go to the left-hand lateral position H−3°, in the top view, it can be seen that we pull on the lateral actuator H1 again. The collectors 11 move to the right such that the light beam F1 goes from the nominal lateral position H0° to the left-hand lateral position H−3°, whereas the exit optical element 12 has not moved. In the side view, it can be seen that the collectors 11 remain in the high position (their axis MM' remains inclined downward). The light beam F1 which exits the exit optical element 12 will thus be oriented downward and to the left as shown by the black square in the grid g shown.

FIG. 40 shows a nominal vertical position V0° and a left-hand lateral position H−3° of the light beam F1. In the top view, it can be seen that the collectors 11 remain to the right, whereas the exit optical element 12 has not moved. To return to the nominal vertical position V0°, in the side view, it can be seen that we push on the vertical actuator H2. The collectors 11 move back down to the nominal vertical position (their axis MM' returns to horizontal) such that the light beam F1 goes from the low vertical position V−7° to the nominal vertical position V0°, whereas the exit optical element 12 has not moved. The light beam F1 which exits the exit optical element 12 will thus be oriented to the left and centered vertically as shown by the black square in the grid g shown.

Figure 41:
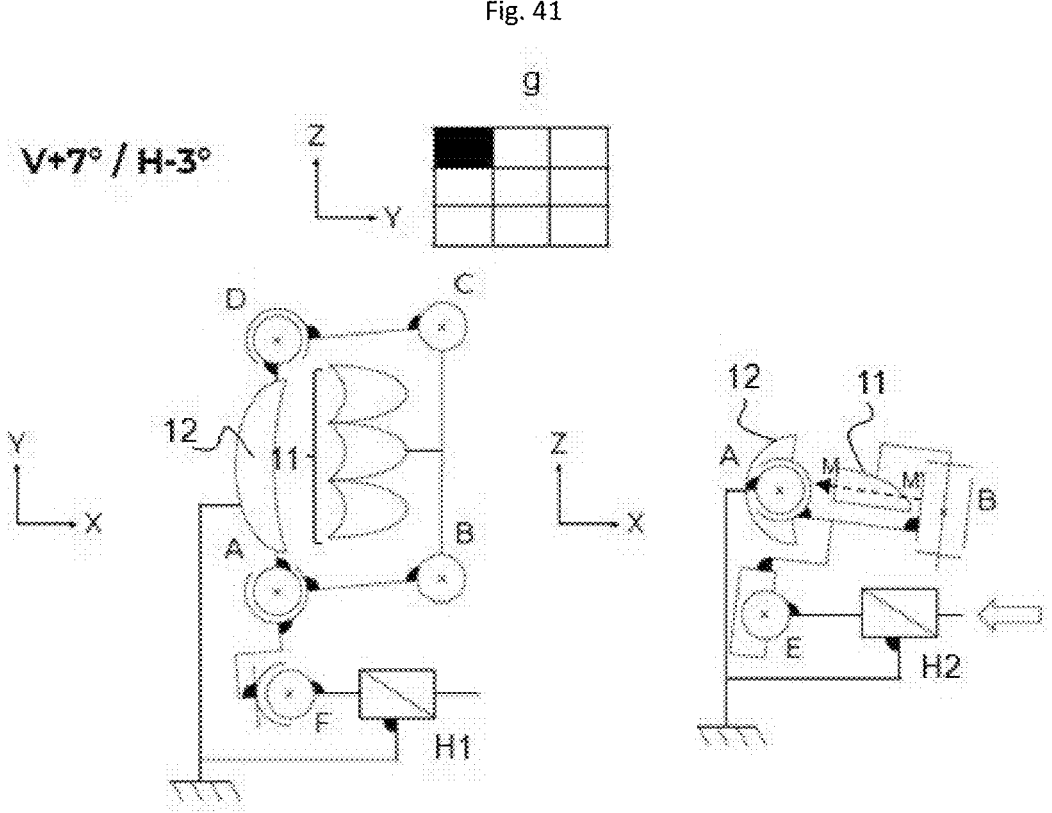
FIG. 41 is a kinematic view of the mechanical elements of the system for vertical relative movement of FIG. 29, when said plurality of collectors together with said plurality of light sources are in a vertical position located below the nominal vertical position of FIG. 33, and of the mechanical elements of the system for lateral relative movement of FIG. 29, when said plurality of collectors together with said plurality of light sources are in a lateral position located to the right of the nominal lateral position of FIG. 33, according to a non-limiting embodiment.

FIG. 41 shows a high vertical position V+7° and a left-hand lateral position H−3° of the light beam F1. In the top view, it can be seen that the collectors 11 remain to the right, whereas the exit optical element 12 has not moved. To go to the high vertical position V+7°, in the side view, it can be seen that we push on the vertical actuator H2 again. The collectors 11 move back down to the low position (their axis MM' is inclined upward) such that the light beam F1 goes from the nominal vertical position V0° to the high vertical position V+7°, whereas the exit optical element 12 has not moved. The light beam F1 which exits the exit optical element 12 will thus be oriented to the left and upward as shown by the black square in the grid g shown.

Of course, the description of the invention is not limited to the embodiments described above and to the field described above. Thus, in another non-limiting embodiment, the exit optical element or elements 12 are mirrors instead of projection lenses.

Thus, the invention described has the following advantages in particular:

it makes it possible to move the light beam F1 laterally, it also makes it possible to move the light beam F1 vertically, it makes it possible to combine a lateral movement and a vertical movement of the light beam F1, it avoids moving the entire luminous module 1 (exit optical element 12/collectors 11/light sources 10) inside the luminous device. Consequently, a person looking at the luminous device from outside the vehicle 2 will not see any part moving, it makes it possible, for vertical movement and lateral movement, to eliminate clearances with respect to the styling components, which clearances (of several millimeters) must be provided when the entire luminous module 1 moves inside the luminous device, the clearances being in this case necessary for the angles of travel so that the luminous module does not hit against the styling components. Consequently, it prevents light leaking through these clearances. Moreover, a person looking at the luminous device from outside the vehicle 2 will not see unsightly clearances, or the technical elements hidden behind the masks, such as, in one non-limiting example, electrical wires, it is a solution which does not distort the light beam F1, because only the collectors 11 and light sources 10 move, it is a solution which makes it possible to have a more compact luminous module 1 in the luminous device. The housing of the luminous device is therefore smaller, it makes it possible to eliminate a structural component used in the prior art which provides for moving the entire luminous module 1, and this reduces the bulk and the weight, it makes it possible to have sufficient angles of lateral and vertical travel without distorting the light beam F1, it makes it possible to not have an exit outer lens facing the luminous module 1, which exit outer lens is necessary in the prior art solution when the entire luminous module 1 moves, to ensure that it is sealed (against water or dirt, etc.). With no exit outer lens, there is no loss of light. The luminous module 1 is thus more effective.

What is claimed is:

1. A luminous module for a vehicle, the luminous module comprising:

at least one light source configured to emit light rays, at least one collector associated with the at least one light source, the at least one collector being configured to collect and direct the light rays from the at least one light source toward at least one exit optical element, the at least one exit optical element configured to transmit the light rays toward the outside of the vehicle to form a light beam, and a system for lateral relative movement of the at least one collector and the at least one associated light source relative to the at least one exit optical element in such a way as to cause the light beam to move laterally, the system for lateral relative movement includes a pivot connection of center A and axis AE and a ball joint of center D which are arranged laterally on either side of the at least one exit optical element, a pivot connection of center B and a pivot connection or ball joint of center C which are arranged laterally on either side of the plurality of collectors, the pivot connection or connections having an axis parallel to the axis AE, two parallel connecting rods with the same length, each respectively connecting the pivot connection of center A and the pivot connection of center B, and the ball joint of center D and the pivot connection or ball joint of center C in such a way as to form a parallelogram ABCD, a primary actuator configured to rotate the pivot connection of center A in a substantially transverse direction in such a way as to transversely move the plurality of collectors, and a primary annular linear connection of center F connecting the primary actuator to one of the connecting rods to form a primary crank.

2. The luminous module as claimed in claim 1, wherein the luminous module includes a plurality of light sources and a plurality of collectors each associated with a light source.

3. The luminous module as claimed in claim 2, wherein the luminous module includes a plurality of exit optical elements, of which one part of the exit optical elements is associated with a first portion of the light beam and the other part of the exit optical elements is associated with a second portion of the light beam.

4. The luminous module as claimed in claim 3, wherein the first portion represents an inclined cut-off of the light beam, and the second portion represents a flat cut-off of the light beam.

5. The luminous module as claimed in claim 1, wherein the pivot connection of center A and axis AE is produced by means of a ball joint of center A and a secondary annular linear connection of center E.

6. The luminous module as claimed in claim 5, further comprising a system for vertical relative movement of the at least one collector and the at least one associated light source relative to the at least one exit optical element in such a way as to cause the light beam to move vertically.

7. The luminous module as claimed in claim 6, wherein the annular linear connection of center E connects a secondary actuator to one of the connecting rods to form a secondary crank, the secondary actuator being configured to rotate the plurality of collectors about the axis AD.

8. The luminous module as claimed in claim 6, wherein the primary annular linear connection has an axis parallel to the axis AE.

9. The luminous module as claimed in claim 6, wherein the vertical relative movement of the at least one collector and the at least one associated light source generates an angle of vertical travel of between plus or minus 10° for the light beam.

10. The luminous module as claimed in claim 6, wherein the vertical relative movement of the at least one collector and the at least one associated light source generates an angle of vertical travel of between plus or minus 7° for the light beam.

11. The luminous module as claimed in claim 1, wherein the at least one collector, the at least one exit optical element and the connecting rods are configured to take up a position (PH0°) in which the parallelogram ABCD forms a rectangle.

12. The luminous module as claimed in claim 1, wherein the lateral relative movement of the at least one collector and the at least one associated light source generates an angle of lateral travel of between plus or minus 5° for the light beam.

13. The luminous module as claimed in claim 1, wherein the at least one exit optical element has an angle of inclination relative to a perpendicular to an optical axis of the luminous module of 15° maximum.

14. The luminous module as claimed in claim 1, wherein the at least one exit optical element has a minimum radius of curvature of 200 mm.

15. The luminous module as claimed in claim 1, wherein the lateral relative movement of the at least one collector and the at least one associated light source generates an angle of lateral travel of between plus or minus 3° for the light beam.

16. A luminous device comprising a luminous module, with the luminous module including at least one light source configured to emit light rays, at least one collector associated with the at least one light source, the at least one collector being configured to collect and direct the light rays from the at least one light source toward at least one exit optical element, the at least one exit optical element configured to transmit the light rays toward the outside of the vehicle to form a light beam, and a system for lateral relative movement of the at least one collector and the at least one associated light source relative to the at least one exit optical element in such a way as to cause the light beam to move laterally, the system for lateral relative movement includes a pivot connection of center A and axis AE and a ball joint of center D which are arranged laterally on either side of the at least one exit optical element, a pivot connection of center B and a pivot connection or ball joint of center C which are arranged laterally on either side of the plurality of collectors, the pivot connection or connections having an axis parallel to the axis AE, two parallel connecting rods with the same length, each respectively connecting the pivot connection of center A and the pivot connection of center B, and the ball joint of center D and the pivot connection or ball joint of center C in such a way as to form a parallelogram ABCD, a primary actuator configured to rotate the pivot connection of center A in a substantially transverse direction in such a way as to transversely move the plurality of collectors, and a primary annular linear connection of center F connecting the primary actuator to one of the connecting rods to form a primary crank.

* * * * *